US009645918B2

(12) United States Patent
Yun et al.

(10) Patent No.: US 9,645,918 B2
(45) Date of Patent: May 9, 2017

(54) STORAGE DEVICES INCLUDING NON-VOLATILE MEMORY AND MEMORY CONTROLLER AND METHODS OF ALLOCATING WRITE MEMORY BLOCKS

(71) Applicant: Samsung Electronics Co., Ltd., Suwon-si (KR)

(72) Inventors: Hyun-Sik Yun, Hwaseong-si (KR); Younwon Park, Suwon-si (KR); Byung-Ki Lee, Hwaseong-si (KR); Do-Sam Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 852 days.

(21) Appl. No.: 13/974,627

(22) Filed: Aug. 23, 2013

(65) Prior Publication Data

US 2014/0059275 A1    Feb. 27, 2014

(30) Foreign Application Priority Data

Aug. 24, 2012 (KR) .................. 10-2012-0092912

(51) Int. Cl.
*G06F 12/00* (2006.01)
*G06F 12/02* (2006.01)

(52) U.S. Cl.
CPC .................. *G06F 12/0246* (2013.01)

(58) Field of Classification Search
None
See application file for complete search history.

(56) References Cited

U.S. PATENT DOCUMENTS 6,170,066 B1    1/2001  See
6,510,488 B2 *  1/2003  Lasser .................. G06F 3/0619
                                              711/103
(Continued)

FOREIGN PATENT DOCUMENTS

JP    2005-209188    8/2005
JP    2008-152788    7/2008
(Continued)

OTHER PUBLICATIONS

Sanam-Shahla et al., "JAM: Justifiable Allocation of Memory with Efficient Mounting and Fast Crash Recovery for NAND Flash Memory File Systems", The International Arab Journal of Information Technology, vol. 7, No. 4, Oct. 2010, p. 395-401.
(Continued)

*Primary Examiner* — David X Yi
*Assistant Examiner* — Craig Goldschmidt
(74) *Attorney, Agent, or Firm* — Myers Bigel, P.A.

(57) ABSTRACT

Storage devices including a flash memory and a memory controller, and write memory block allocating methods of the storage devices are provided. A write memory block allocating method may include storing a pre-allocation table in a Random Access Memory (RAM) of a memory controller. The pre-allocation table may include allocation order information of a pre-allocated memory block included in a flash memory. The method may also include receiving a write request from a host, determining whether a write memory block for the write request can be allocated according to the pre-allocation table and allocating the pre-allocated memory block as the write memory block according to the pre-allocation table when the write memory block can be allocated according to the pre-allocation table.

4 Claims, 29 Drawing Sheets

(56) References Cited

U.S. PATENT DOCUMENTS

| | | |
|---|---|---|
| 6,587,915 B1 | 7/2003 | Kim |
| 7,127,551 B2 | 10/2006 | Beck |
| 7,421,624 B2 | 9/2008 | In et al. |
| 7,702,844 B2 | 4/2010 | Chung et al. |
| 7,774,541 B2 | 8/2010 | Shin et al. |
| 7,907,441 B2 | 3/2011 | Moon et al. |
| 2008/0147994 A1 | 6/2008 | Jeong et al. |
| 2008/0177935 A1* | 7/2008 | Lasser ................. G06F 12/0246 711/103 |
| 2009/0144477 A1* | 6/2009 | Chen .................... G06F 13/385 710/302 |

FOREIGN PATENT DOCUMENTS

| | | |
|---|---|---|
| JP | 2009-503735 | 1/2009 |
| JP | 2009-519555 | 5/2009 |
| KR | 10-2003-0040817 | 5/2003 |
| KR | 10-2005-0070672 | 7/2005 |

OTHER PUBLICATIONS

Chung et al., "PORCE: An efficient power off recovery scheme for flash memory", Journal of Systems Architecture 54 (2008), p. 935-943.

\* cited by examiner

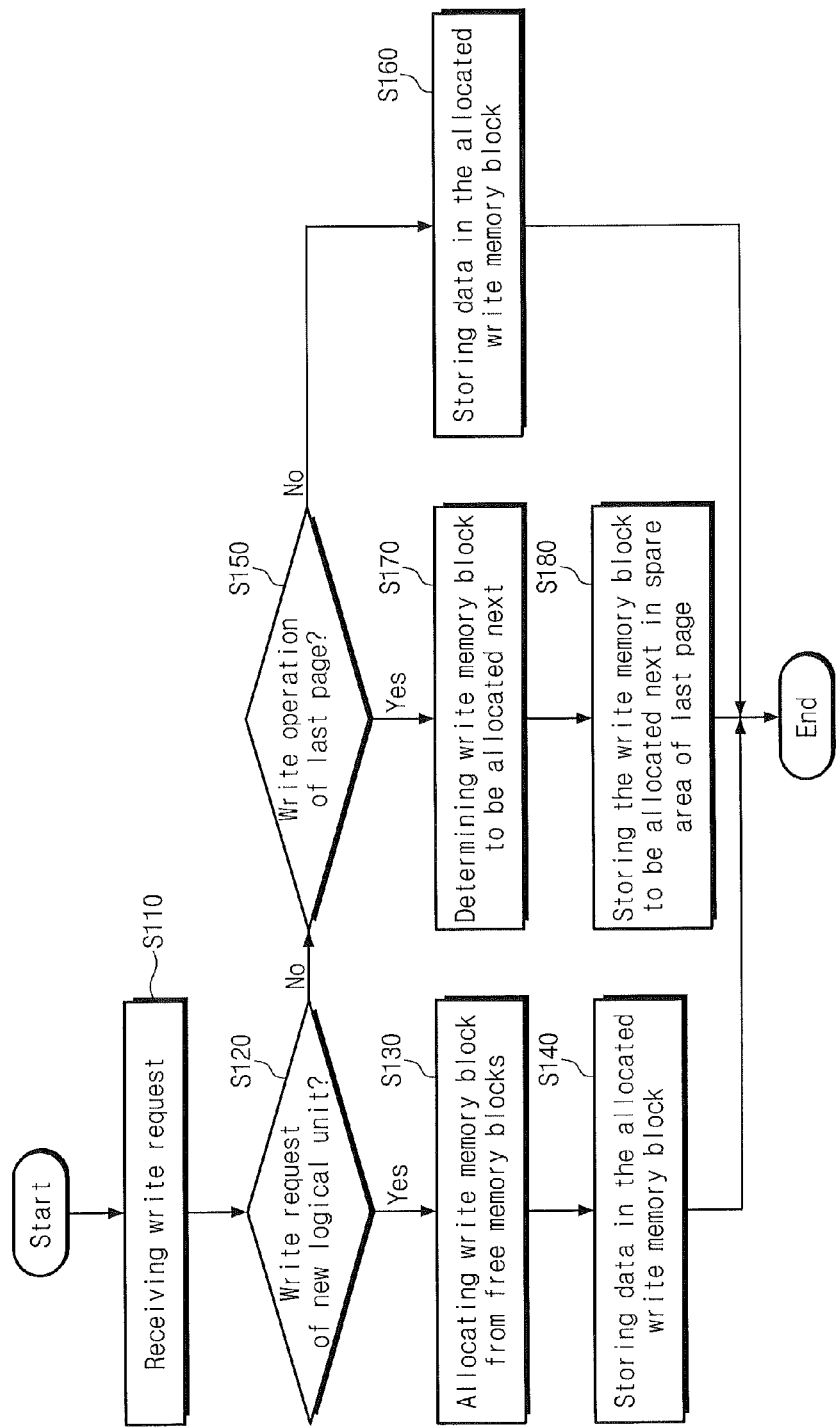

US 9,645,918 B2

STORAGE DEVICES INCLUDING NON-VOLATILE MEMORY AND MEMORY CONTROLLER AND METHODS OF ALLOCATING WRITE MEMORY BLOCKS

CROSS-REFERENCE TO RELATED APPLICATIONS

This U.S. non-provisional patent application claims for priority under 35 U.S.C. §119 to Korean Patent Application No. 10-2012-0092912, filed on Aug. 24, 2012, in the Korean Intellectual Property Office, the disclosure of which is hereby incorporated by reference in its entirety.

FIELD

The present disclosure generally relates to the field of electronics, and more particularly storage devices.

BACKGROUND

A flash memory device may be included in a portable storage device. The portable storage device may include a flash translation layer (FTL), which may provide a mapping table that translates a logical address from a file system to a physical address of the flash memory device. The mapping table may be stored in a volatile memory of a memory controller and thus the mapping table may be lost when a power fails or is suddenly removed. Therefore the memory controller may flush the mapping table to the flash memory device whenever the mapping table is updated so that the mapping table may be recovered from the flash memory device after power is restored.

SUMMARY

A write memory block allocating method of a memory controller configured to control a flash memory may include generating a main pre-allocation table including allocation order information of a pre-allocated memory block included in the flash memory, storing the main pre-allocation table in a meta area of the flash memory and storing a pre-allocation table in a Random Access Memory (RAM) of the memory controller by reading the main pre-allocation table at the meta area of the flash memory. The method may also include receiving a write request from a host, determining whether a write memory block for the write request can be allocated according to the pre-allocation table and allocating the pre-allocated memory block as the write memory block according to the pre-allocation table when the write memory block can be allocated according to the pre-allocation table.

According to various embodiments, the method may further include allocating a free memory block included in the flash memory as the write memory block when the write memory block cannot be allocated according to the pre-allocation table. The pre-allocation table may not include allocation order information of the free memory block.

In various embodiments, the method may further include flushing a physical address and a logical address of the free memory block to a main mapping table in the meta area of the flash memory when the free memory block is allocated as the write memory block According to various embodiments, the method may further include deleting allocation order information of the free memory block from the pre-allocation table.

In various embodiments, the method may further include generating an updated pre-allocation table after deleting allocation order information of the free memory block from the pre-allocation table According to various embodiments, the method may further include flushing the updated pre-allocation table to the main pre-allocation table.

In various embodiments, the method may further include determining whether the write request is for a new logical unit when the write memory block cannot be allocated according to the pre-allocation table and allocating a free memory block as the write memory block according to a tail-trail table when the write request is not for a new logical unit. the pre-allocation table may not include allocation order information of the free memory block and the tail-trail table may include a physical address and identification information of a logical unit of the free memory block According to various embodiments, the method may include storing the tail-trail table in the RAM of the memory controller.

In various embodiments, the method may further include allocating a free memory block as the write memory block when the write request is for a new logical unit. The pre-allocation table may not include allocation order information of the free memory block.

According to various embodiments, the method may include allocating a free memory block as the write memory block according to a tail-trail table or allocating the pre-allocated memory block as the write memory block according to the pre-allocation table when the write request is not for a new logical unit.

In various embodiments, the method may further include recovering a mapping table from the memory controller using the main pre-allocation table and a main mapping table in the meta area of the flash memory.

A storage device may include a flash memory including a user area and a meta area and a memory controller configured to control the flash memory. The memory controller may be configured to allocate one of a plurality of memory blocks included in the user area of the flash memory as a write memory block according to a pre-allocation table when a write request is received from a host, and the pre-allocation table, in a Random Access Memory (RAM) in the memory controller, may include allocation order information of the one of the plurality of memory blocks.

According to various embodiments, a main pre-allocation table may be in the meta area of the flash memory.

In various embodiments, the RAM may further include a tail-trail table and the memory controller may be configured to allocate an other of the plurality of memory blocks included in the user area of the flash memory as a write memory block according to the tail-trail table when a write request not for a new logical unit is received from the host. The tail-trail table may include a physical address and information of a logical unit of the other of the plurality of memory blocks.

A write memory block allocating method of a storage device may include storing a pre-allocation table in a controller. A non-volatile memory integrated circuit (IC) may include the first and second memory blocks and the pre-allocation table may include allocation order information of a first memory block and excluding allocation order information of a second memory block. The method may also include receiving a write request for a logical unit from a host and allocating the first memory block as a write memory block for the write request according to the pre-allocation table or allocating the second memory block as the write memory block for the write request. The method may further include storing a mapping data in a mapping table at the controller when the second memory block is allocated as the write memory block. The mapping data may include a physical address and a logical address of the second memory block.

In various embodiments, the method may include flushing the mapping table from the controller to a main-mapping table in the non-volatile memory IC after storing the mapping data in the controller.

In various embodiments, the first memory block may include one memory block or a plurality of memory blocks included in the non-volatile memory IC, and allocating the second memory block as the write memory block may be performed after allocating all of the first memory block as write memory blocks according to the pre-allocation table.

According to various embodiments, the second memory block may be one among a plurality of second memory blocks and the write request may be a first write request. The method may additionally include receiving a second write request for the logical unit after receiving the first write request, selecting a next write memory block among remaining un-allocated ones of the plurality of second memory blocks and storing a physical address of the next write memory block in the write memory block allocated in response to the first write request.

In various embodiments, the method may include storing a tail-trail table at the controller, receiving a third write request for the logical unit after receiving the second write request and allocating the next write memory block as a new write memory block according to the tail-trail table. The tail-trail table may include the physical address of the next write memory block and identification information for the logical unit.

In various embodiments, the method may include generating a main pre-allocation table at the controller, storing the main pre-allocation table in the non-volatile memory IC and storing the pre-allocation table in the controller by scanning the main pre-allocation table in the non-volatile memory IC.

BRIEF DESCRIPTION OF THE DRAWINGS

FIG. 4 is a flowchart illustrating a write memory block allocating method according to some embodiments of the inventive concept.

DETAILED DESCRIPTION

Figure 1:
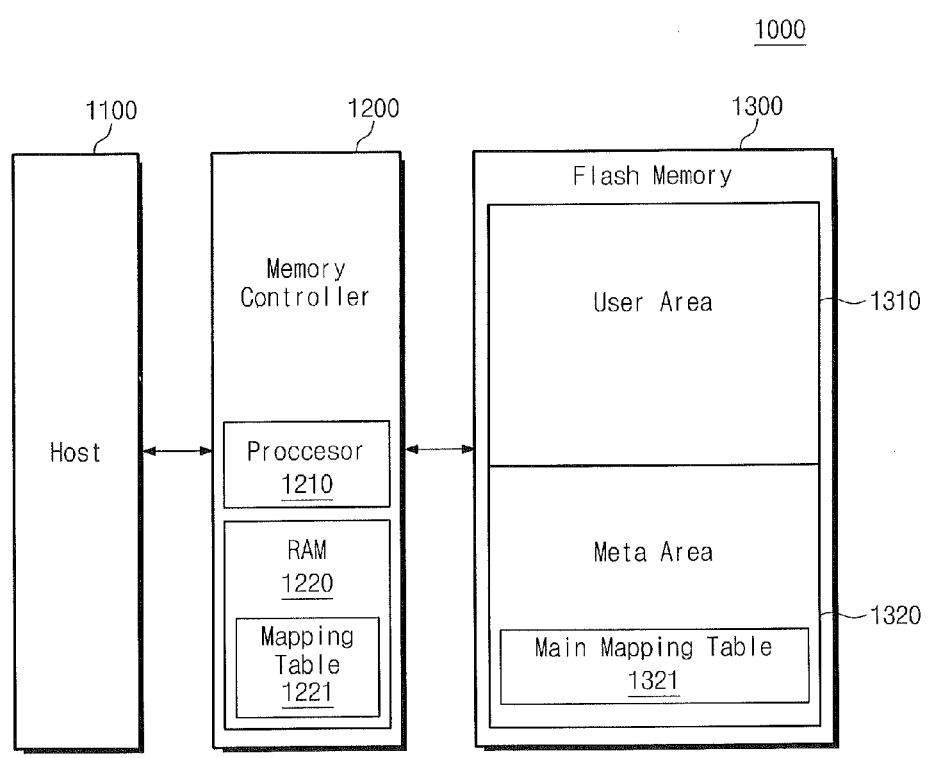
FIG. 1 is a block diagram illustrating a system including a flash memory according to some embodiments of the inventive concept.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 2:
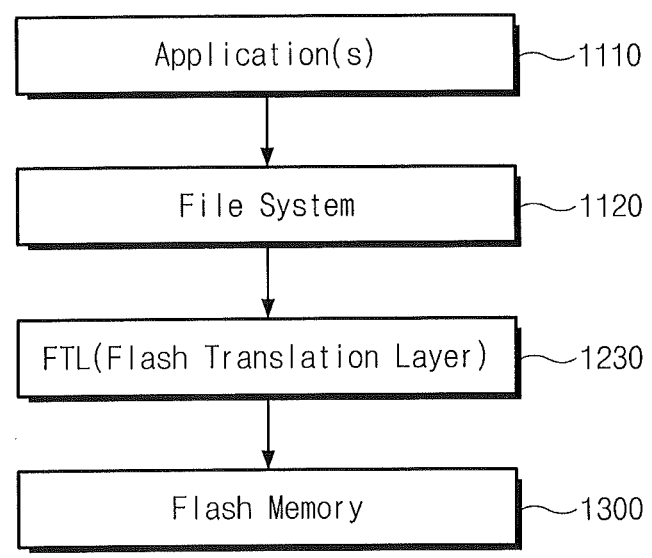
FIG. 2 is a block diagram illustrating a software layer of the system of FIG. 1.

FIG. 1 is a block diagram illustrating a system including a flash memory according to some embodiments of the inventive concept. FIG. 2 is a block diagram illustrating a software layer of the system of FIG. 1. Referring to FIGS. 1 and 2, a system 1000 may include a host 1100, a memory controller 1200, and a flash memory 1300. The components 1100, 1200, and 1300 may be implemented as separate chips, modules, or devices, or may be included in one device. The memory controller 1200 and the flash memory 1300 may be implemented as one device to be connected with the host 1100.

The host 1100 may send a read or write request to the memory controller 1200 using an application or a file system described in FIG. 2. The memory controller 1200 may control an operation of the flash memory 1300 in response to a read or write request from the host 1100. For example, the memory controller 1200 may control write, read, and erase operations of the flash memory 1300 in response to a read or write request from the host 1100.

In some embodiments, data may be exchanged between the host 1100 and the memory controller 1200 according to a predetermined protocol. For example, the host 1100 and the memory controller 1200 may exchange data using at least one of various interface protocols such as an USB (Universal Serial Bus) protocol, an MMC (multimedia card) protocol, a PCI (peripheral component interconnection) protocol, a PCI-E (PCI-express) protocol, an ATA (Advanced Technology Attachment) protocol, a Serial-ATA protocol, a Parallel-ATA protocol, an SCSI (small computer small interface) protocol, an ESDI (enhanced small disk interface) protocol, an IDE (Integrated Drive Electronics) protocol.

The memory controller 1200 may include a processor 1210 and a Random Access Memory (RAM) 1220. The processor 1210 may control an overall operation of the memory controller 1200. For example, the processor 1210 may drive a flash translation layer (FTL) described in FIG. 2.

The RAM 1220 may be a working memory of the memory controller 1200. The RAM 1220 may be a buffer memory between the host 1100 and the flash memory 1300. The RAM 1220 may include a mapping table 1221. The mapping table 1221 may include information for a translation operation of the FTL. The mapping table 1221 may include information on mapping relationship between a logical address of a file organized by a file system described in FIG. 2 and a physical address of the flash memory 1300. In some embodiments, in the case that a free memory block is assigned as a write memory block, the memory controller 1200 may update the mapping table 1221.

The flash memory 1300 may write, read, or erase memory blocks according to a control signal of the memory controller 1200. The flash memory 1300 may be formed of a plurality of memory blocks having a plurality of pages, respectively. The flash memory 1300 may include a user area 1310 and a meta area 1320. The user area may be used to store user data. The user area 1310 may be formed of a plurality of memory blocks included in the flash memory 1300. Each memory block of the user area 1310 may be formed of a plurality of pages, each of which has a data area for storing user data and a spare area for storing additional data. The additional data may include, for example, an error correcting code (ECC), a logical address of data stored in the data area, bad block information. In some embodiments, a portion of spare areas may include a physical address of a write memory block to be allocated next.

The meta area 1320 may include a main mapping table 1321. The main mapping table 1321 may include information on mapping relationship between a logical address received from the host 1100 and a physical address of the flash memory 1300.

In some embodiments, the meta area 1320 may be formed of one or more memory blocks of a plurality of memory blocks included in the flash memory 1300.

At initialization of the memory controller 1200, the memory controller 1200 may read the main mapping table 1321 to store it at the mapping table 1221 in the RAM 1220. In some embodiments, the memory controller 1200 may allocate a new write memory block in response to a write request received from the host 1100. The memory controller 1200 may update the mapping table based on mapping relationship between a physical address of a memory block assigned to a new write memory block and a logical address corresponding to the physical address.

Since the mapping table 1221 is in the RAM 1220, the mapping table 1221 may be lost when there is a power outage, such as a sudden power-off. Therefore, as appreciated by the present inventors, the mapping table 1221 in the RAM 1220 needs to be flushed to the main mapping table 1321 in the flash memory 1300 whenever the mapping table 1221 is updated, so that the mapping table 1221 can be recovered from the main mapping table 1321. Those repetitive flushing operations, however, may degrade performance of the system 100.

Referring to FIG. 2, a software layer of the system 1000 may include an application 1110, a file system 1120, a flash translation layer 1230, and a flash memory 1300.

The application 1110 may indicate a variety of application programs driven in the system 1000. For example, the application 1110 may include, for example, a word processor, a web browser, an image playback program, or a game program.

The file system 1120 may organize data or files to be stored in the flash memory 1300. For example, the file system 1120 may provide a memory controller 1200 with a logical address corresponding to a write request. The file system 1120 may have a variety of formats according to an operating system of the host 1100. In some embodiments, the file system 1120 may include, for example, FAT (File Allocation Table), FAT32, NTFS (NT File System), HFS (Hierarchical File System), JSF2 (Journaled File System2), XFS, ODS-5 (On-Disk Structure-5), UDF, ZFS, UFS (Unix File System), ext2, ext3, ext4, ReiserFS, Reiser4, ISO 9660, Gnome VFS, BFS, or WinFS. In some embodiments, the file system 1120 may be driven by the host 1100.

The flash translation layer 1230 may provide an interface between the host 1100 and the flash memory 1300 such that the flash memory 1300 is efficiently used. The flash translation layer 1230 may receive a logical address generated by the file system 1300 to translate it to a physical address usable for the flash memory 1300. The flash translation layer 1230 may manage the address translation using a mapping table 1221. In some embodiments, the flash translation layer 1230 may be driven by the memory controller 1200.

Figure 3:
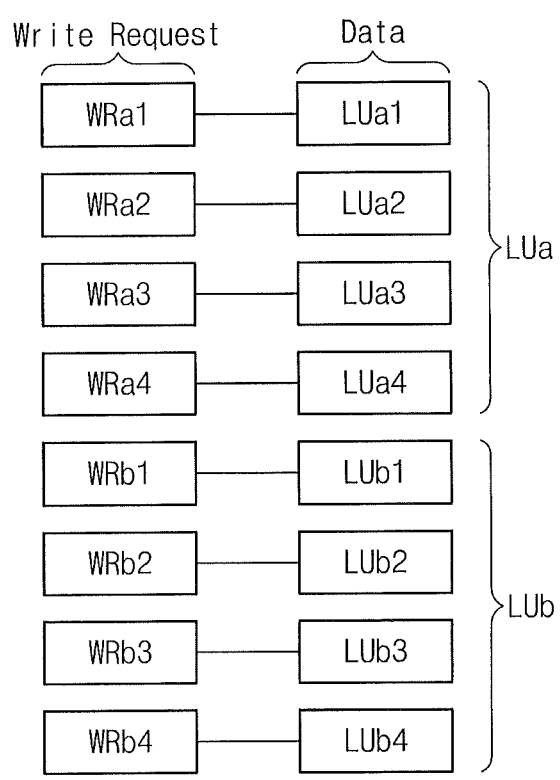
FIG. 3 is a diagram illustrating write requests generated by a host.

FIG. 3 is a diagram illustrating write requests generated by a host. Referring to FIGS. 1 and 3, the host 1100 may generate write requests WRa1, WRa2, WRa3, WRa4, WRb1, WRb2, WRb3, and WRb4. The host 1100 may send the write requests WRa1, WRa2, WRa3, WRa4, WRb1, WRb2, WRb3, and WRb4 to a memory controller 1200.

The write requests WRa1, WRa2, WRa3, WRa4, WRb1, WRb2, WRb3, and WRb4 may be write requests corresponding to data LUa1, LUa2, LUa3, LUa4, LUb1, LUb2, LUb3, and LUb4 of logical units LUa and LUb, respectively. For example, the write requests WRa1, WRa2, WRa3, and WRa4 may be write requests of a first file organized by a file system 1120. The write requests WRb1, WRb2, WRb3, and WRb4 may be write requests of a second file organized by the file system 1120. Therefore, the data LUa1, LUa2, LUa3, and LUa4 of a logical unit LUa corresponding to the write requests WRa1, WRa2, WRa3, and WRa4 and the data LUb1, LUb2, LUb3, and LUb4 of a logical unit LUb corresponding to the write requests WRb1, WRb2, WRb3, and WRb4 may be stored at different physical units. A physical unit may be formed of one or more of memory blocks of the flash memory 1300.

For description purpose, some embodiments will be described with reference to the write requests WRa1, WRa2, WRa3, WRa4, WRb1, WRb2, WRb3, and WRb4, the logical units LUa and LUb, and data LUa1, LUa2, LUa3, LUa4, LUb1, LUb2, LUb3, and LUb4. Embodiments below will be described under an assumption that a flash memory includes first to fourth memory blocks as free memory blocks and each of the first to fourth memory blocks includes three pages. Also, memory blocks allocated as a write memory block from among the first to fourth memory blocks or memory blocks corresponding to allocation order information of which is included in a pre-allocation table may be excluded from a free memory block.

FIG. 4 is a flowchart illustrating a write memory block allocating method according to some embodiments of the inventive concept. Referring to FIGS. 1 to 4, in operation S110, the memory controller 1200 may receive a write request. For example, the host 1100 may generate a write request on a file or data to be stored in the flash memory 1300 based on the file system 1120. The memory controller 1200 may receive the write request generated by the host 1100.

In operation S120, the memory controller 1200 may determine whether the received write request is a write request on a new logical unit. For example, if the memory controller 1200 allocates a write memory block in response to a write request on a logical unit LUa, a subsequent write request on the logical unit LUa may not be a write request on a new logical unit.

In the case that the received write request is a write request on a new logical unit, the memory controller 1200 may allocate one of free memory blocks of the flash memory 1300 as a write memory block. The free memory block may indicate such a memory block whose data area is at an erase state. In some embodiments, in a case where a write memory block is allocated from free memory blocks, a logical address corresponding to the received write request and a physical address of a write memory block corresponding to the logical address may be stored at a mapping table 1221 of the memory controller 1200. The mapping table 1221 stored in the RAM 1220 may be flushed to the main mapping table 1321 of the meta area 1320.

In operation S140, the memory controller 1200 may store data corresponding to the received write request in the allocated write memory block.

If the received write request is not a write request on a new logical unit, S150, the memory controller 1200 may determine whether the received write request is a write request on a last page of the allocated write memory block.

If the received write request is not a write request on a last page of the allocated write memory block, in operation S160, the memory controller 1200 may store data corresponding to the received write request in the allocated write memory block.

If the received write request is a write request on a last page of the allocated write memory block, in operation S170, the memory controller 1200 may determine a write memory block to be next allocated based on free memory blocks.

In operation S180, the memory controller 1200 may control the flash memory 1300 such that a physical address of the write memory block to be next allocated is stored at a spare area of the last page on which a write operation is performed.

If the received write request is not a write request on a last page of the allocated write memory block, the memory controller 1200 may control the flash memory 1300 in response to the received write request such that data is written in the allocated write memory block.

FIGS. 5A to 5D are diagrams illustrating a write memory block allocating method according to some embodiments of the inventive concept. In some embodiments, a memory controller 1200 may receive write requests WRa1, WRa2, WRa3, WRa4, WRb1, WRb2, WRb3, and WRb4. The write requests WRa1, WRa2, WRa3, WRa4, WRb1, WRb2, WRb3, and WRb4, logical units LUa and LUb, and data LUa1, LUa2, LUa3, LUa4, LUb1, LUb2, LUb3, and LUb4 might be described with reference to FIG. 3. The flash memory 1300 may include first to fourth memory blocks BLK1 to BLK4, which are free memory blocks. Each of the first to fourth memory blocks may include three pages. Memory blocks allocated as a write memory block through the memory controller 1200 may be excluded from a free memory block.

Figure 5A:
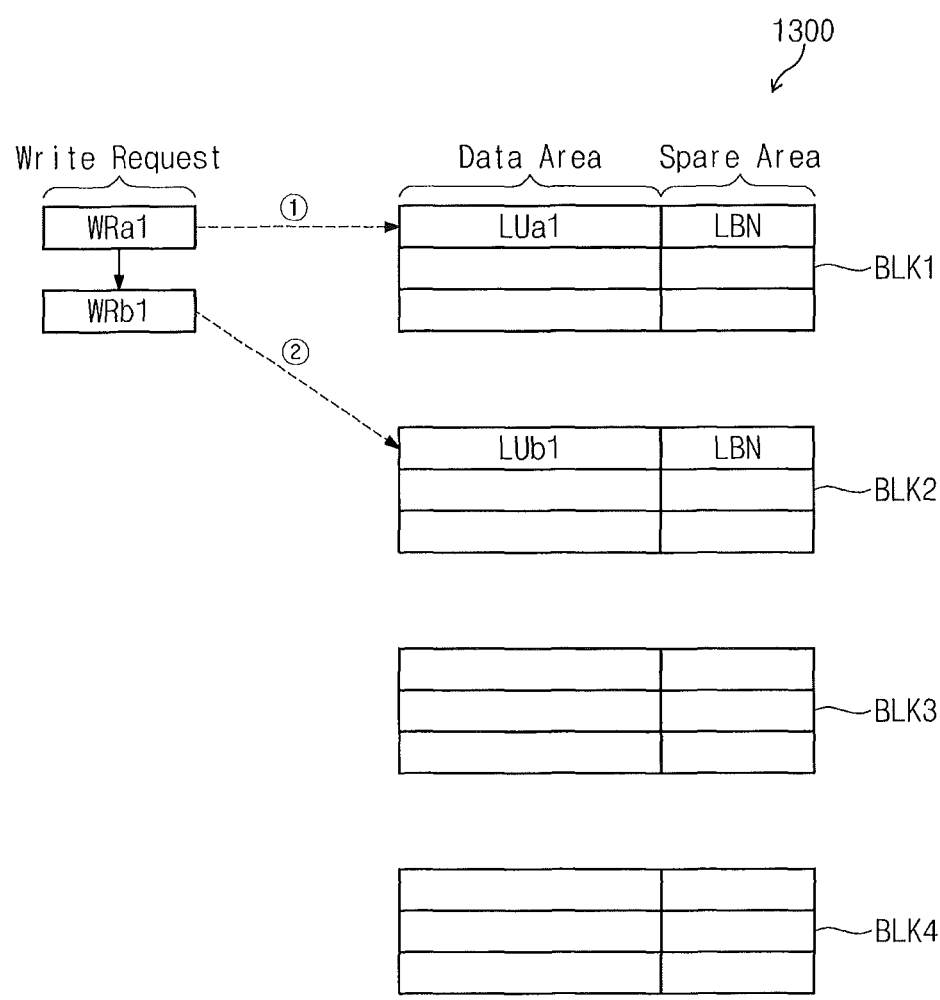
FIGS. 5A to 5D are diagrams illustrating a write memory block allocating method according to some embodiments of the inventive concept.

Referring to FIG. 5A, the memory controller 1200 may receive write requests WRa1 and WRb1. The write request WRa1 may be a write request on a new logical unit LUa. Thus, the memory controller 1200 may allocate a first memory block BLK1 as a write memory block corresponding to the new logical unit LUa. Likewise, since the write request WRb1 is a write request on a new logical unit LUb, the memory controller 1200 may allocate a second memory block BLK2 as a write memory block corresponding to the new logical unit LUb. The memory controller 1200 may control the flash memory 1300 such that data LUa1 and LUb1 are stored in the first and second memory blocks BLK1 and BLK2, respectively. The memory controller 1200 may control the flash memory 1300 such that logical addresses LBN of the data LUa1 and LUb1 are stored at spare areas of the first and second memory blocks BLK1 and BLK2, respectively.

In some embodiments, the memory controller 1200 may update a mapping table 1221 of a RAM 1220 based on mapping relationship between logical addresses on the data LUa1 and LUb1 and physical addresses of the first and second write memory blocks BLK1 and BLK2 corresponding to the logical addresses. The memory controller 1200 may flush the updated mapping table 1221 to the main mapping table 1321.

Figure 5B:
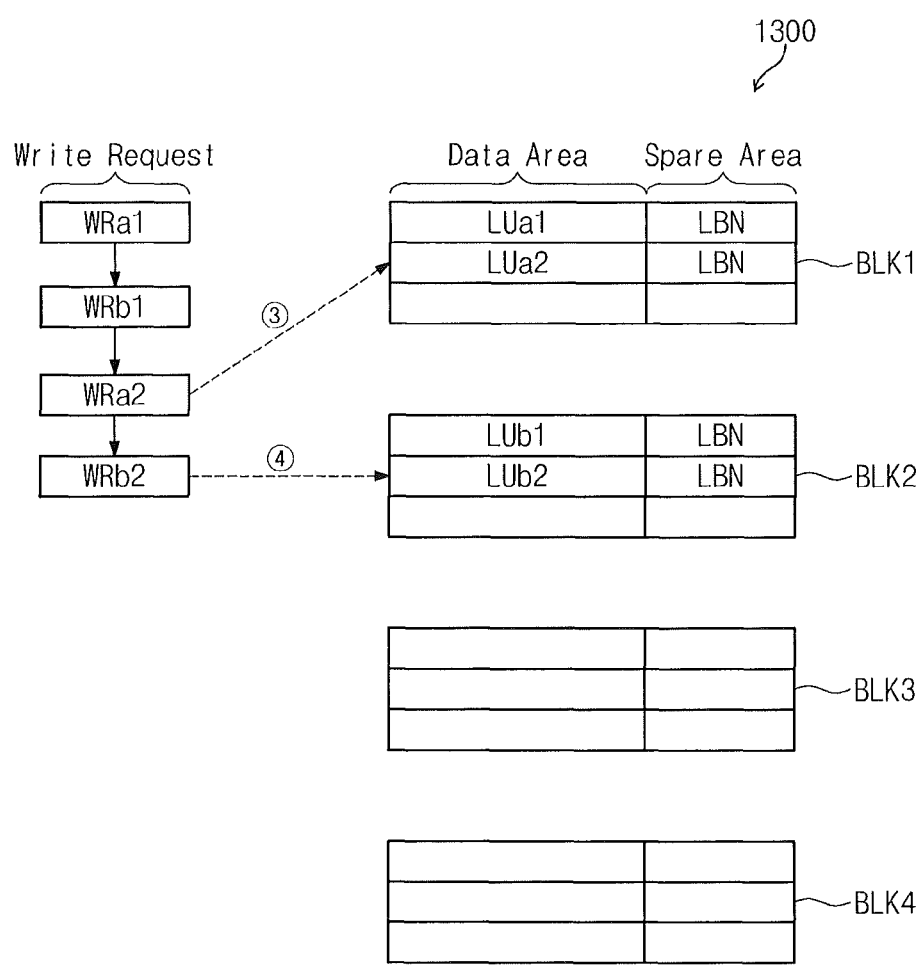

Referring to FIG. 5B, the memory controller 1200 may receive write requests WRa2 and WRb2. Since the first and second memory blocks BLK1 and BLK2 on the logical units LUa and LUb are allocated as write memory blocks, the write requests WRa2 and WRb2 are not write requests on new logical units. The write requests WRa2 and WRb2 are not write requests on last pages of the first and second memory blocks BLK1 and BLK2. The memory controller 1200 may control the flash memory 1300 in response to the write requests WRa2 and WRb2 such that data LUa2 and LUb2 are written in the first and second memory blocks BLK1 and BLK2. The memory controller 1200 may control the flash memory 1300 such that logical addresses LBN of the data LUa2 and LUb2 are stored at spare areas of the first and second memory blocks BLK1 and BLK2, respectively.

Figure 5C:
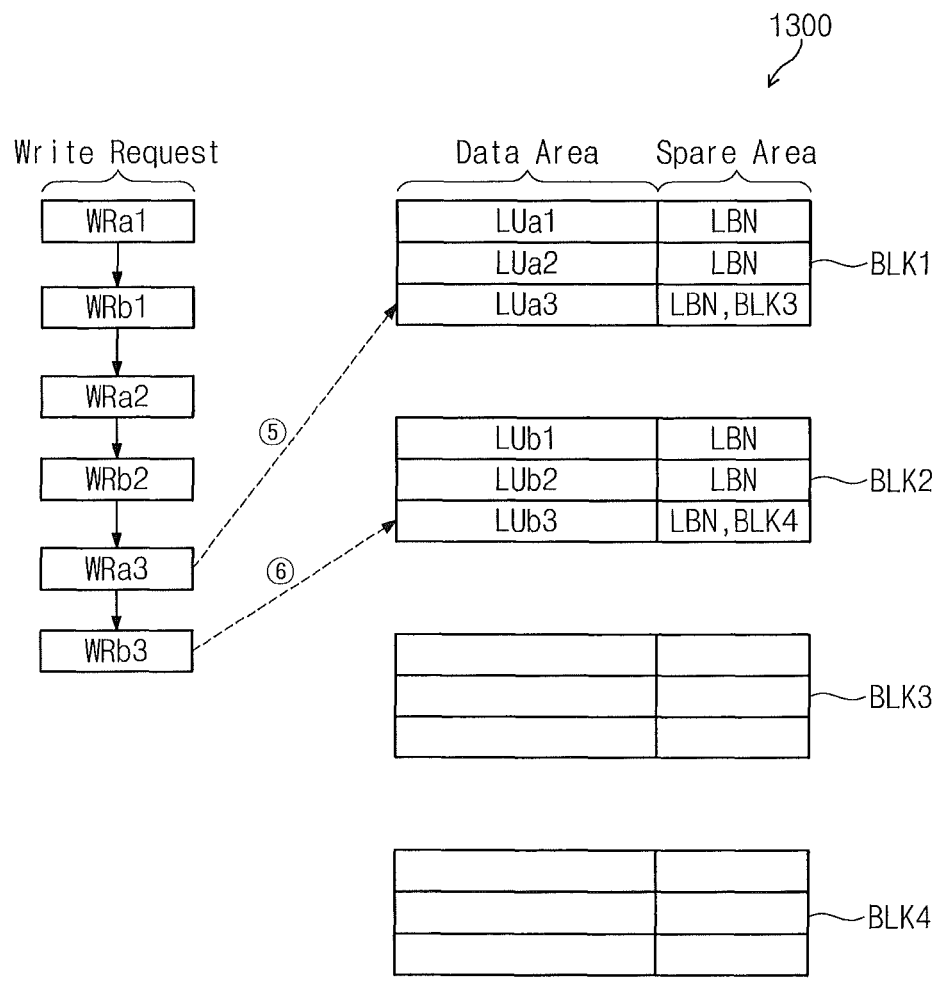

Referring to FIG. 5C, the memory controller 1200 may receive write requests WRa3 and WRb3. The write requests WRa3 and WRb3 are not write requests on new logical units. The write requests WRa3 and WRb3 are write requests on last pages of the first and second memory blocks BLK1 and BLK2. Thus, the memory controller 1200 may determine third and fourth memory blocks BLK3 and BLK4 as write memory blocks, which will be next allocated, in response to the write requests WRa3 and WRb3. The memory controller 1200 may control the flash memory 1300 such that data LUa3 and LUb3 are written in the first and second memory blocks BLK1 and BLK2. The memory controller 1200 may control the flash memory 1300 in response to the write request WRa3 such that a physical address of the third memory block BLK3 to be next allocated is written at a spare area of a last page of the first memory block BLK1. The memory controller 1200 may control the flash memory 1300 in response to the write request WRb3 such that a physical address of the fourth memory block BLK4 to be next allocated is written at a spare area of a last page of the second memory block BLK2.

Figure 5D:
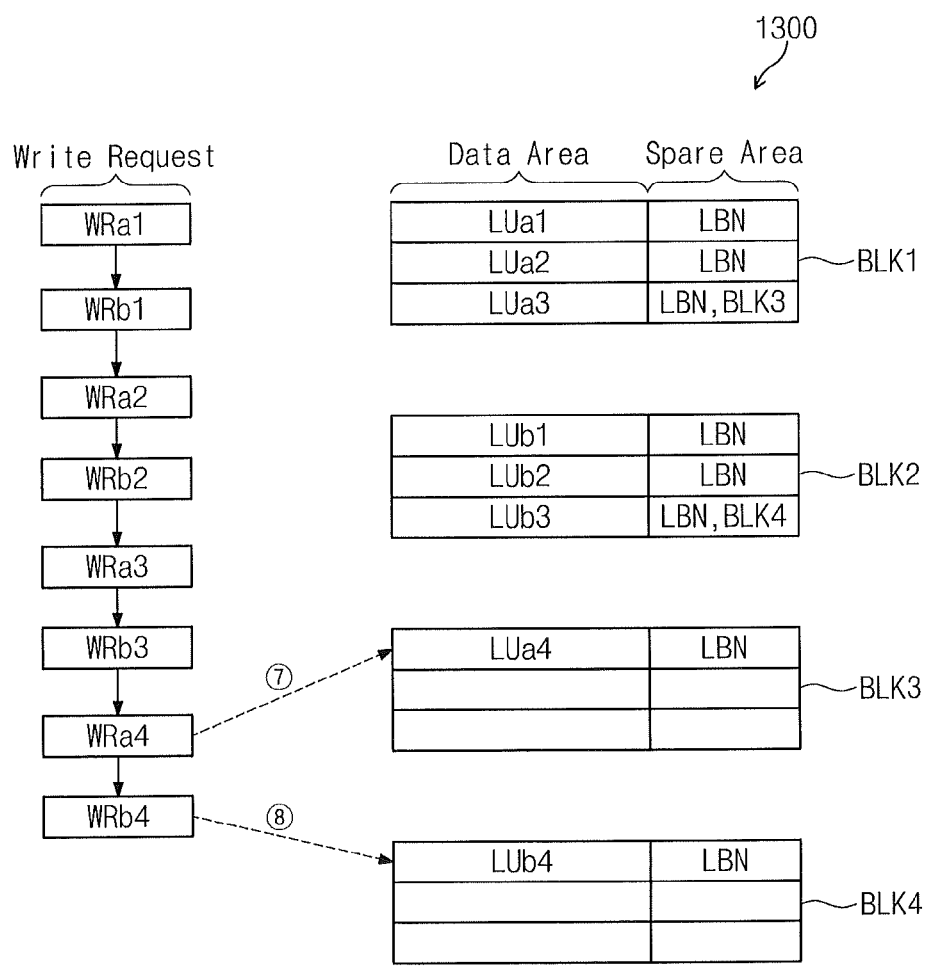

Referring to FIG. 5D, the memory controller 1200 may receive write requests WRa4 and WRb4. The write requests WRa4 and WRb4 may be write requests corresponding to the logical units LUa and LUb. Since all pages of the write memory blocks BLK1 and BLK2 allocated to the logical units LUa and LUb are written, it is impossible to write data in the first and second memory blocks BLK1 and BLK2. Thus, the memory controller 1200 may control the flash memory 1300 in response to the write request WRa4 such that data LUa4 is stored in the third memory block BLK3 corresponding to the physical address of which is written at a spare area of a last page of the first memory block BLK1. Likewise, the memory controller 1200 may control the flash memory 1300 in response to the write request WRb4 such that data LUb4 is stored in the write memory block BLK4 corresponding to the physical address of which is written at a spare area of a last page of the second memory block BLK2.

As illustrated in FIGS. 5A to 5D, allocation of the third and fourth memory blocks BLK3 and BLK4 may not necessitate flushing of the mapping table 1221. In the case that the mapping table 1221 driven at a RAM 1220 is lost, due to such as sudden power-off (SPO), the memory controller 1200 may recover the mapping table 1221 by scanning spare areas of last pages of the first and second write memory blocks BLK1 and BLK2.

Figure 6A:
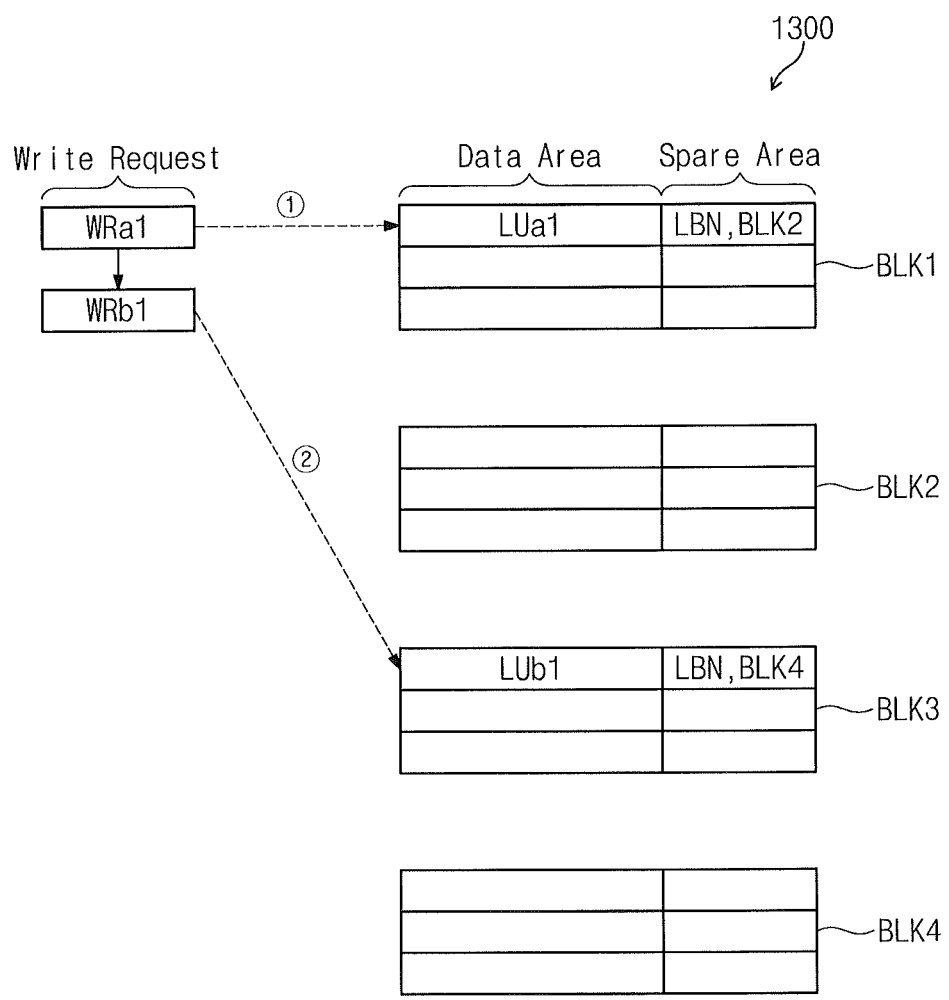
FIGS. 6A to 6C are diagrams illustrating a write memory block allocating method according to some embodiments of the inventive concept.
Figure 6B:
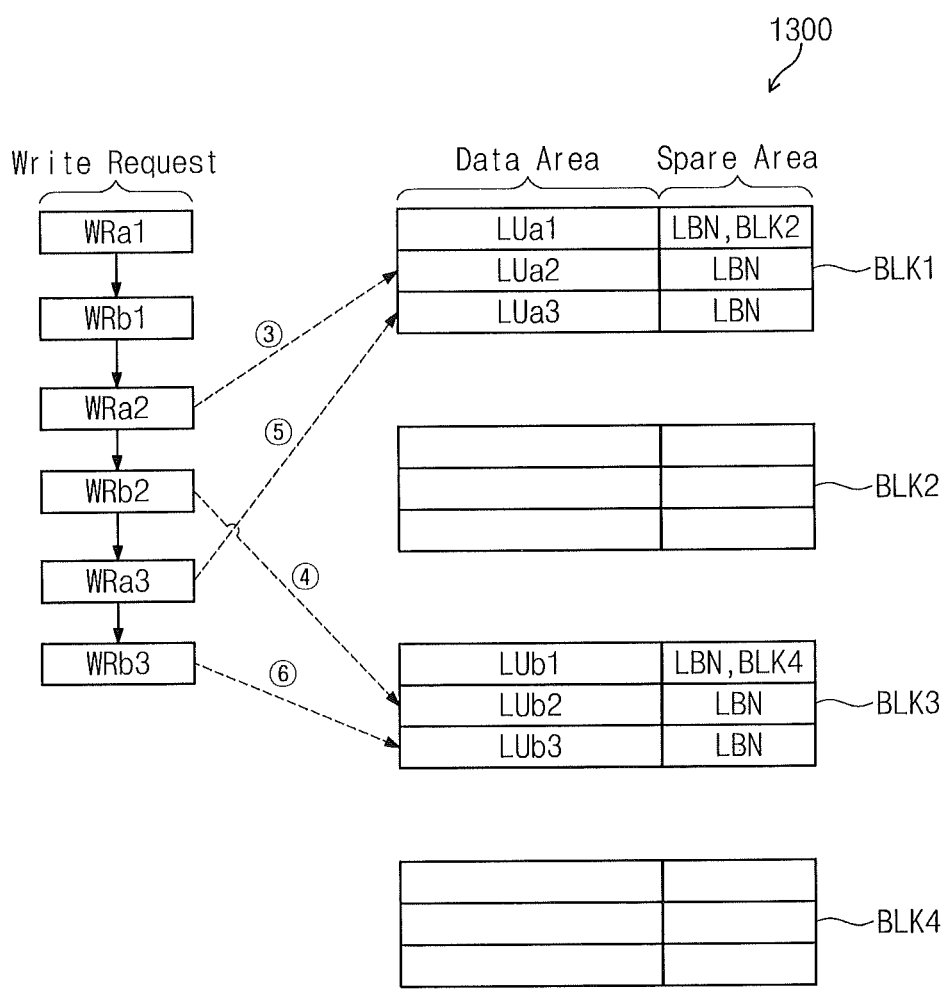
Figure 6C:
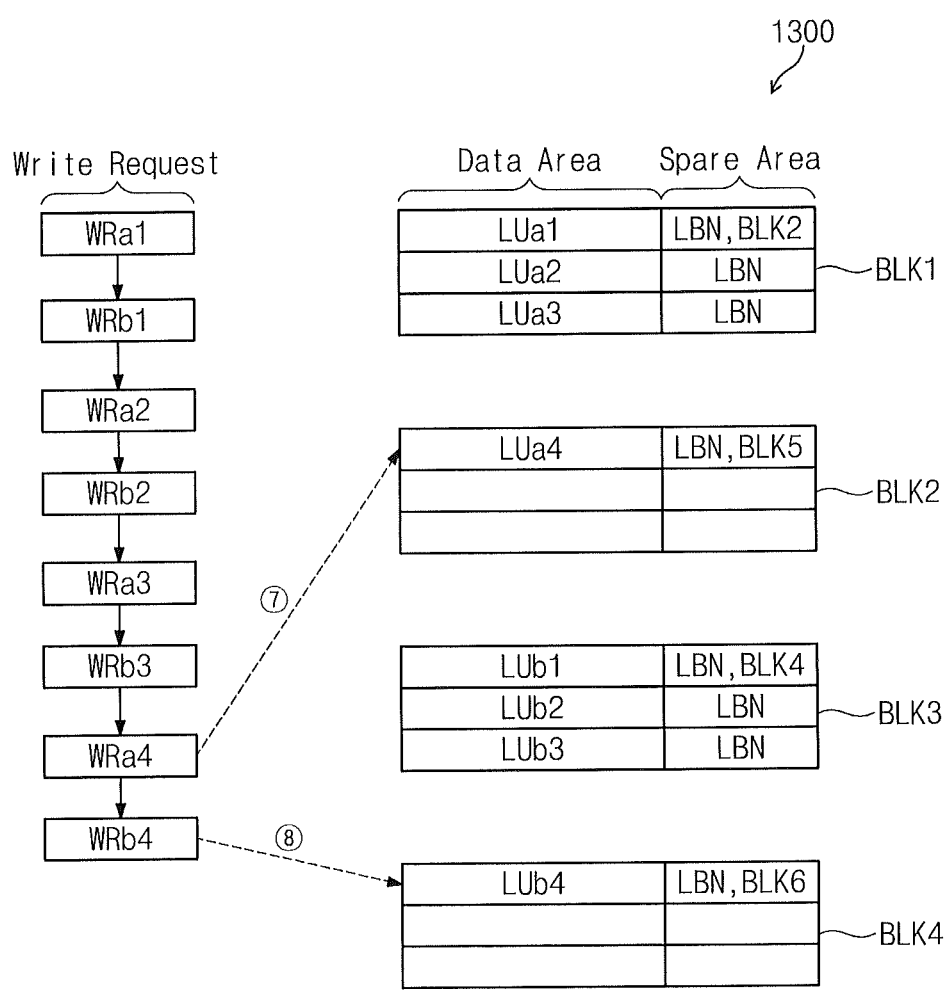

FIGS. 6A to 6C are diagrams illustrating a write memory block allocating method according to some embodiments of the inventive concept. In some embodiments, a memory controller 1200 may receive write requests WRa1, WRa2, WRa3, WRa4, WRb1, WRb2, WRb3, and WRb4. The write requests WRa1, WRa2, WRa3, WRa4, WRb1, WRb2, WRb3, and WRb4, logical units LUa and LUb, and data LUa1, LUa2, LUa3, LUa4, LUb1, LUb2, LUb3, and LUb4 might be described with reference to FIG. 3. In some embodiments, the memory controller 1200 may determine a write memory block to be next allocated at a write operation of a first page.

Referring to FIG. 6A, the memory controller 1200 may receive a write request WRa1. The write request WRa1 is a write request on a new logical unit LUa. Thus, the memory controller 1200 may allocate a first memory block BLK1 as a write memory block in response to the write request WRa1. The memory controller 1200 may determine a second memory block BLK2 as a write memory block to be next allocated. The memory controller 1200 may control a physical address of a flash memory 1300 such that the second memory block BLK2 is stored at a spare area of a first page of the first memory block BLK1.

The memory controller 1200 may receive a write request WRb1. The write request WRb1 is a write request on a new logical unit LUb. Since first and second memory blocks BLK1 and BLK2 are assigned as a write memory block and a write memory block to be next allocated, respectively, those may be excluded from free memory blocks. The memory controller 1200 may allocate the third memory block BLK3 as a write memory block from the free memory blocks. The memory controller 1200 may determine the fourth memory block BLK4 as a write memory block to be next allocated. The memory controller 1200 may control the flash memory 1300 such that a physical address of the fourth memory block BLK4 is stored at a spare area of a first page of the third memory block BLK3.

Referring to FIG. 6B, the memory controller 1200 may receive write requests WRa2, WRa3, WRb2, and WRb3. Logical units LUa and LUb corresponding to the write requests WRa2, WRa3, WRb2, and WRb3 may not be new logical units. Thus, the memory controller 1200 may control the flash memory 1300 in response to the write requests WRa2, WRa3, WRb2, and WRb3 such that data LUa2, LUa3, LUb2, and LUb3 are written in the first and third memory blocks BLK1 and BLK3, respectively. The memory controller 1200 may control the flash memory 1300 such that logical addresses LBN of the data LUa2, LUa3, LUb2, and LUb3 are stored at spare areas of the first and third memory blocks BLK1 and BLK3, respectively.

Referring to FIG. 6C, the memory controller 1200 may receive write requests WRa4 and WRb4. The write requests WRa4 and WRb4 are not write requests on new logical units. The first and third memory blocks BLK1 and BLK3 allocated as the write memory blocks of the logical units LUa and LUb may not include writable pages. Therefore, the memory controller 1200 may control the flash memory such that data LUa4 and LUb4 are written in the write memory blocks BLK2 and BLK4 corresponding to the physical addresses of which are stored in the first pages of the first and third memory blocks BLK1 and BLK3. In some embodiments, since the first pages of the second and fourth write memory blocks BLK2 and BLK4 are written, the memory controller 1200 may determine one of free memory blocks as write memory blocks to be next allocated in response to the write requests WRa4 and WRb4.

In the case that the second and fourth write memory blocks BLK2 and BLK4 are allocated as write memory blocks, flushing of the mapping table 1221 stored at a RAM 1220 may not be required. Thus, it is possible to improve the performance of the system 1000.

Figure 7:
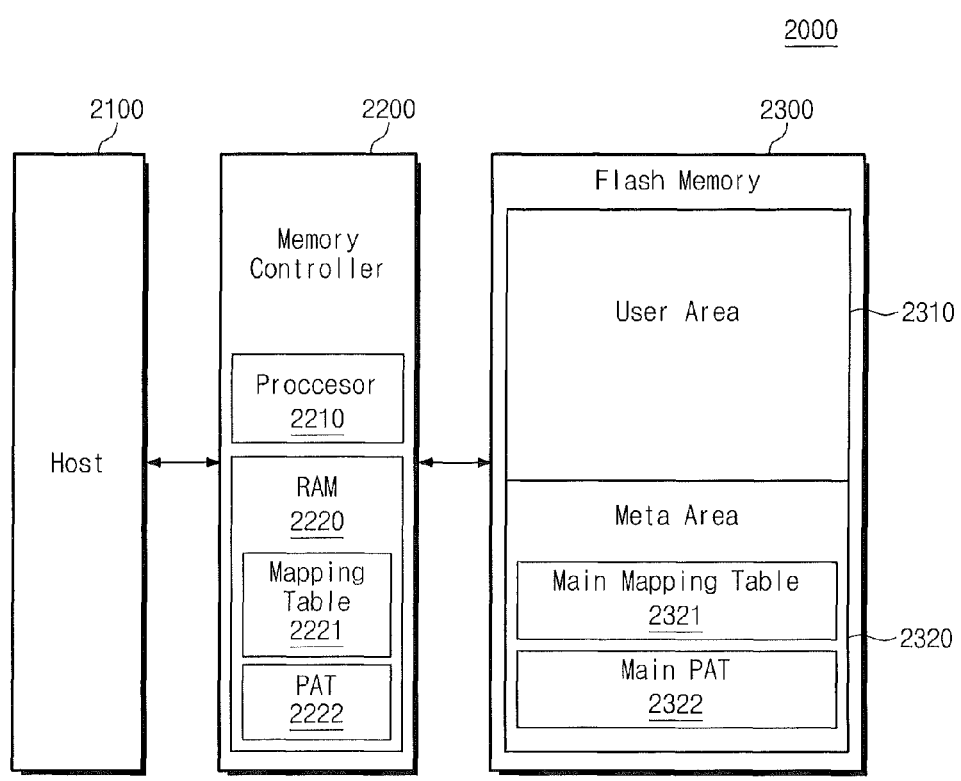
FIG. 7 is a block diagram illustrating a system including a flash memory according to some embodiments of the inventive concept.

FIG. 7 is a block diagram illustrating a system including a flash memory according to some embodiments of the inventive concept. Referring to FIG. 7, a system 2000 may include a host 2100, a memory controller 2200, and a flash memory 2300. The memory controller 2200 may include a processor 2210 and a RAM 2220. The RAM 2220 may include a mapping table 2221 and a pre-allocation table 2222. The flash memory 2300 may include a user area 2310 and a meta area 2320. The meta area 2320 may include a main mapping table 2321 and a main pre-allocation table 2322. The components 2100, 2200, 2210, 2220, 2221, 2300, 2310, 2320, and 2321 of FIG. 7 may be same or similar to those described with reference to FIG. 1.

The pre-allocation table 2222 may include allocation order information of free memory blocks included in the flash memory 2300. For example, the flash memory 2300 may include first to nth memory blocks. The first to nth memory blocks may be free memory blocks. The pre-allocation table 2222 may include allocation order information of the first to kth memory blocks and k may be less than or equal to n.

In some embodiments, the memory controller 2200 may read the main pre-allocation table 2322 of the meta area 2320 to store it in the RAM 2220. The memory controller 2200 may allocate a write memory block based on the pre-allocation table 2222 stored in the RAM 2220. A method of allocating a write memory block based on the pre-allocation table 2222 will be described with reference to FIGS. 8, 9A, 9B and 9C.

In some embodiments, in a case where allocation order information is included in the pre-allocation table 2222 and mapping relationship information between a physical address of a memory block allocated as a write memory block and a logical address corresponding to the physical address is flushed to the main mapping table 2231, the memory controller 2200 may delete the physical address and allocation order information corresponding to the physical address in the pre-allocation table 2222. The memory controller 2200 may flush the pre-allocation table 2222, from which allocation order information is deleted, to the main pre-allocation table 2322. The memory controller 2200 may update the pre-allocation table 2222, from which the allocation order information is deleted, based on free memory blocks. The memory controller 2200 may flush the updated pre-allocation table 2222 to the main pre-allocation table 2322.

Figure 8:
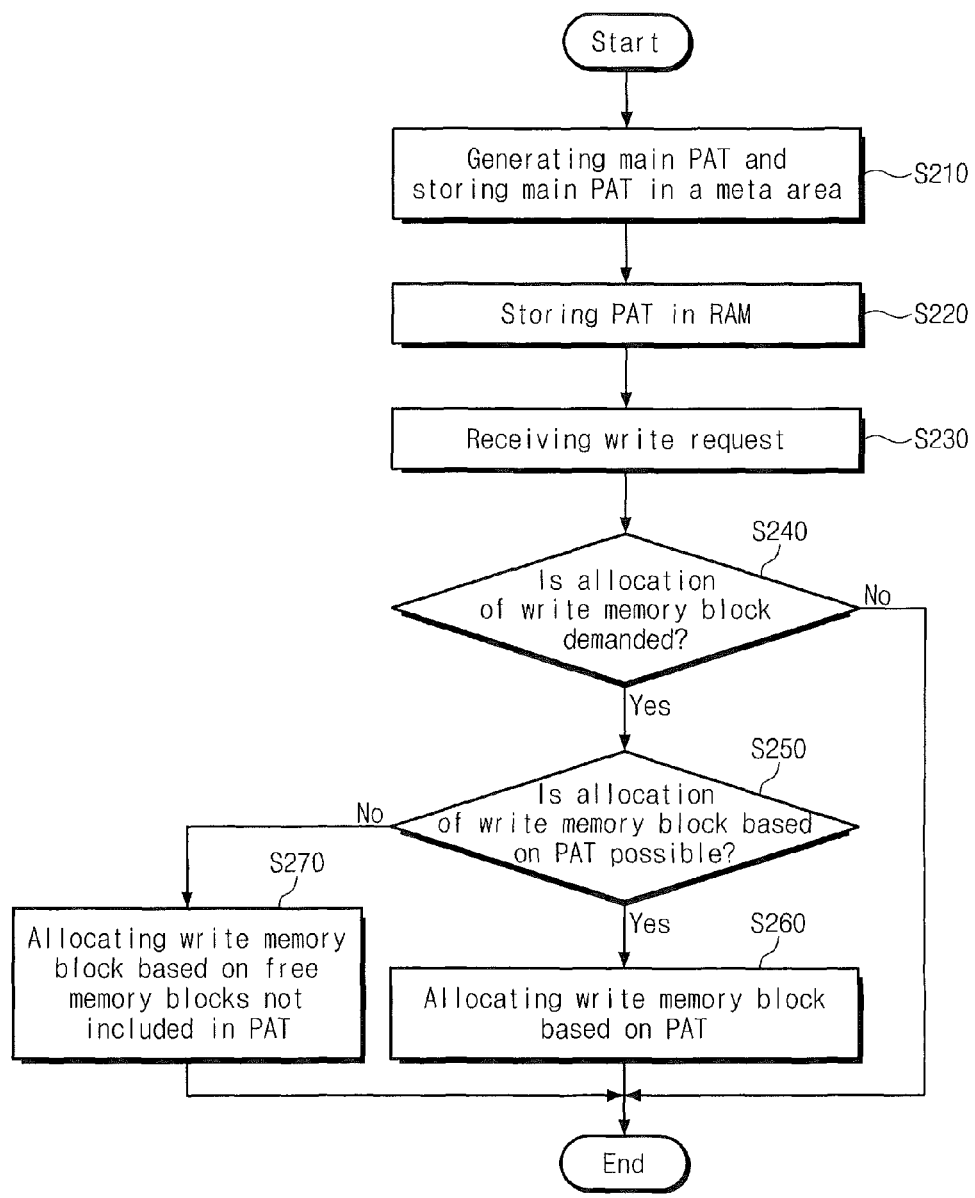
FIG. 8 is a flowchart illustrating a write memory block allocating method according to some embodiments of the inventive concept.

FIG. 8 is a flowchart illustrating a write memory block allocating method according to some embodiments of the inventive concept. Referring to FIGS. 7 and 8, in operation S210, the memory controller 2200 may generate the main pre-allocation table 2322 based on free memory blocks of the flash memory 2300, and may store the main pre-allocation table 2322 in the meta area 2320 of the flash memory 2300.

In operation S220, the memory controller 2200 may read the main pre-allocation table 2322 stored in the meta area 2320, and may store the pre-allocation table 2322 in the RAM 2220 based on the main pre-allocation table 2322.

In operation S230, the memory controller 2200 may receive a write request from the host 2100. For example, the host 2100 may generate a write request of a file or data to be stored in the flash memory 2300 based on a file system. The memory controller 2200 may receive the write request generated by the host 2100.

In operation S240, the memory controller 2200 may determine whether allocation of a write memory block is required, in response to the received write request. For example, in the case that the received write request is a write request on a new logical unit or an allocated memory block does not include a usable page, the memory controller 2200 may determine the allocation of the write memory block to be required.

If the allocation of the write memory block is required, in operation S250, the memory controller 2200 may determine whether the allocation of the write memory block is possible, based on the pre-allocation table 2222. For example, if all memory blocks whose allocation order information are stored in the pre-allocation table 2222 are allocated as write memory blocks, it is impossible to allocate a write memory block based on the pre-allocation table 2222.

If the allocation of the write memory block is possible, in operation S260, the memory controller 2200 may allocate a write memory block based on the pre-allocation table 2222. For example, the pre-allocation table 2222 may include allocation order information by which a first memory block, a second memory block, and a third memory block are allocated in order. The memory controller 2200 may allocate write memory blocks in an order of a first memory block, a second memory block, and a third memory block.

If the allocation of the write memory block is impossible, in operation S270, the memory controller 2200 may allocate write memory blocks among free memory blocks whose allocation order information is not included in the pre-allocation table 2222.

In the case that the allocation of the write memory block is not required, the memory controller 2200 may control the flash memory 2300 such that data is written in the allocated write memory block.

Figure 9A:
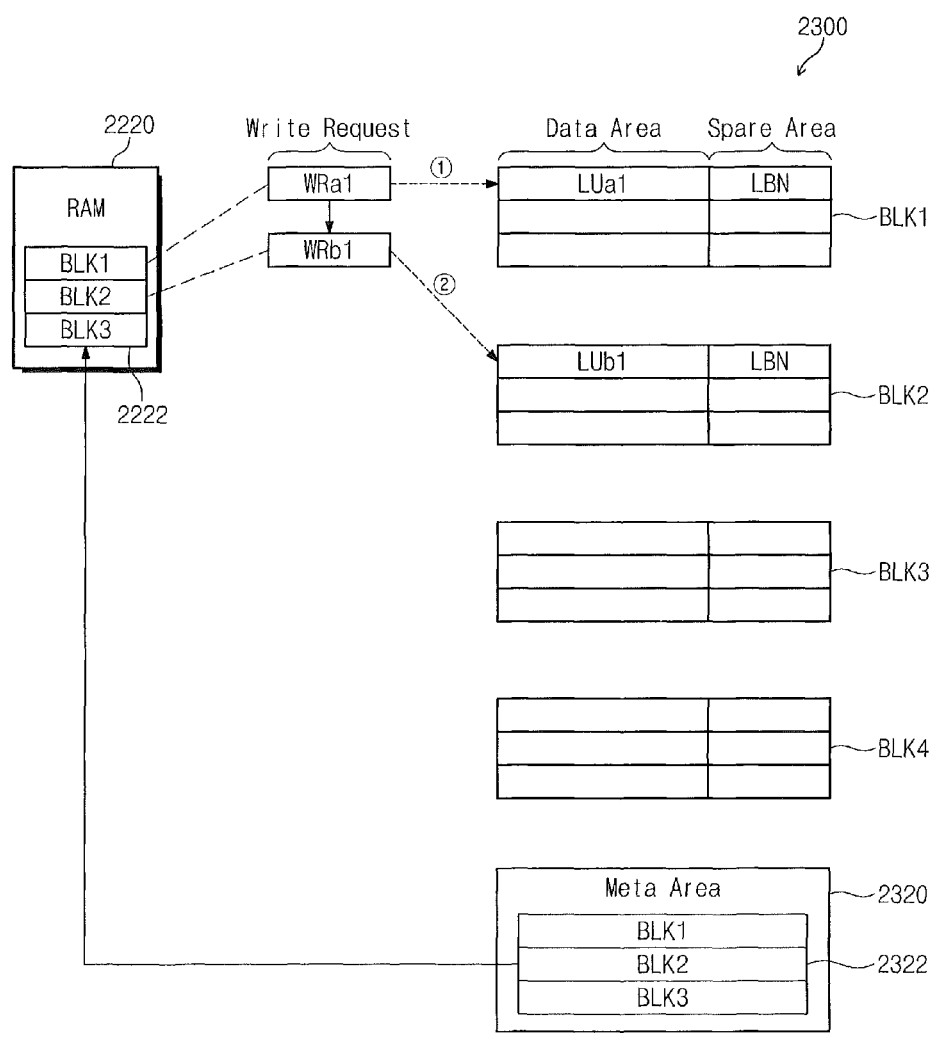
FIGS. 9A to 9C are diagrams illustrating a write memory block allocating method according to some embodiments of the inventive concept.
Figure 9B:
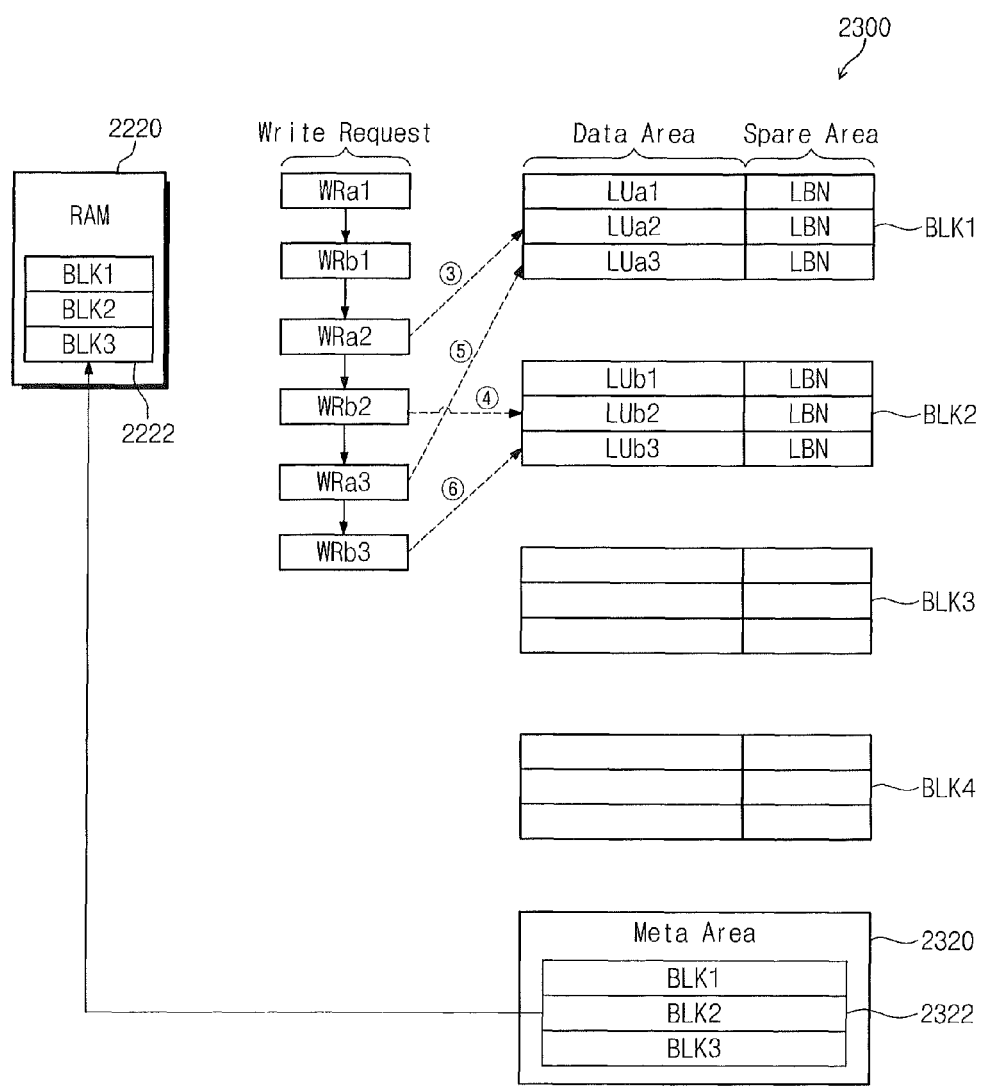
Figure 9C:
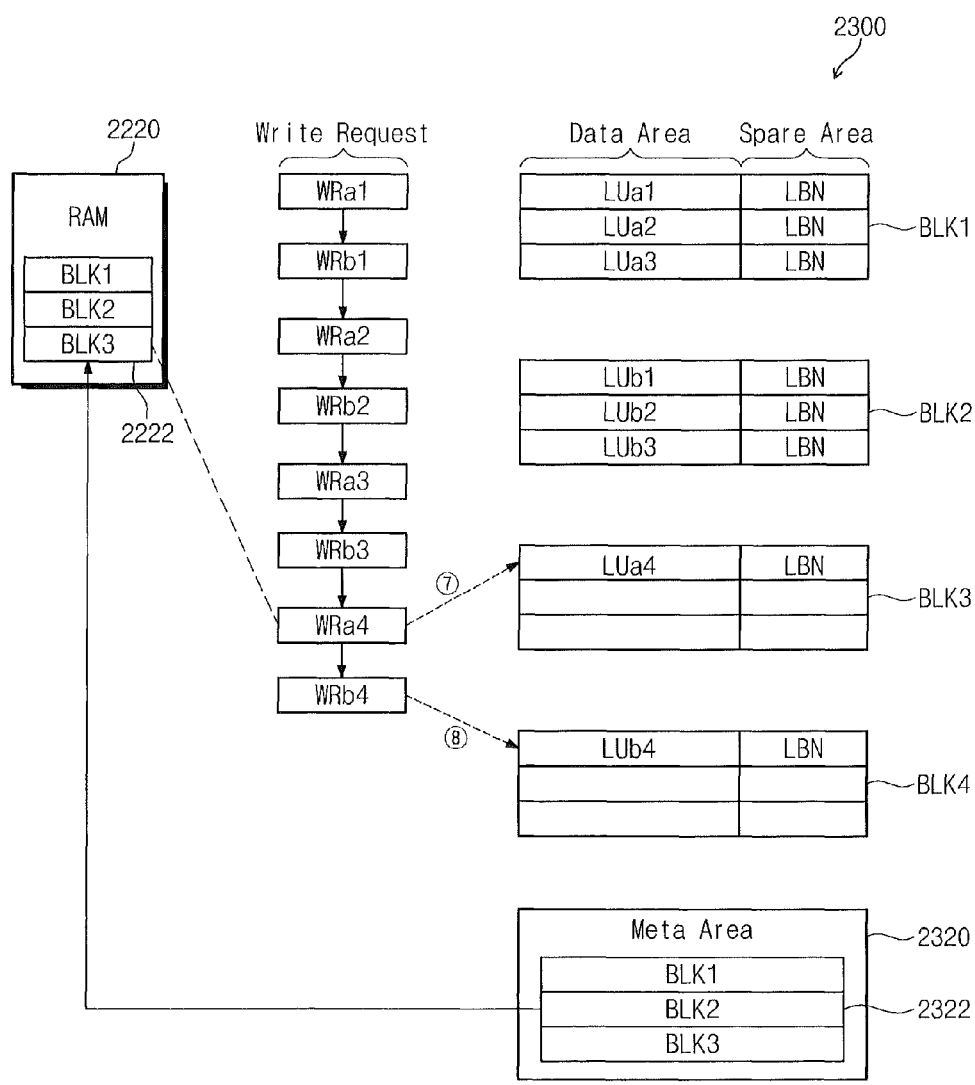

FIGS. 9A to 9C are diagrams illustrating a write memory block allocating method according to some embodiments of the inventive concept. In some embodiments, a memory controller 2200 may receive write requests WRa1, WRa2, WRa3, WRa4, WRb1, WRb2, WRb3, and WRb4. The meta area 2320 of the flash memory 2300 may include the main pre-allocation table 2322. The memory controller 2200 may read the main pre-allocation table 2322 to store the read information in the RAM 2220. A pre-allocation table 2222 stored in the RAM 2220 may include allocation order information of first to third memory blocks BLK1 to BLK3. Thus, a fourth memory block BLK4 may be a free memory block, and the first to third memory blocks BLK1 to BLK3 may be excluded from free memory blocks.

Referring to FIG. 9A, the memory controller 2200 may read the main pre-allocation table 2322 of the meta area 2320 to store it in the RAM 2220. The memory controller 2200 may allocate a write memory block based on the pre-allocation table 222 stored in the RAM 2220. For example, the memory controller 2200 may receive write requests WRa1 and WRa2. The write requests WRa1 and WRa2 are write requests on new logical units LUa and LUb. When the write requests WRa1 and WRa2 are received, the memory controller 2200 may allocate first and second memory blocks BLK1 and BLK2 as write memory blocks based on the pre-allocation table 2222.

Referring to FIG. 9B, the memory controller 2200 may receive write requests WRa2, WRa3, WRb2, and WRb3. The write requests WRa2, WRa3, WRb2, and WRb3 may be write requests corresponding to logical units LUa and LUb.

Since first and second memory blocks BLK1 and BLK2 were allocated to the logical units LUa and LUb, the memory controller 2200 may control the flash memory 2300 in response to the write requests WRa2, WRa3, WRb2, and WRb3 such that data LUa2, LUa3, LUb2, and LUb3 are written in the first and third write memory blocks BLK1 and BLK3, respectively.

Referring to FIG. 9C, the memory controller 2200 may receive write requests WRa4 and WRb4. The write requests WRa4 and WRb4 may be write requests on the logical units LUa and LUb. However, since first and second memory blocks BLK1 and BLK2 allocated to the logical units LUa and LUb do not include usable page, the memory controller 2200 may allocate a third memory block BLK3 based on the pre-allocation table 2322.

Since the first to third memory blocks BLK1 to BLK3 included in the pre-allocation table 2322 are all allocated, the memory controller 2200 may allocate a fourth memory block BLK4, which is a free memory block, as a write memory block in response to the write request WRb4.

The memory controller 2200 may generate main pre-allocation information 2322, and may flush it to the meta area 2320 once at an initial stage. The memory controller 2200 may store the main pre-allocation information 2322 in the RAM 2220, and may allocate a write memory block based on the stored pre-allocation information 2222. Thus, a flush operation on the main mapping table may not be performed until all memory blocks the allocation order information of which is stored at the pre-allocation table 222 are allocated.

Figure 10:
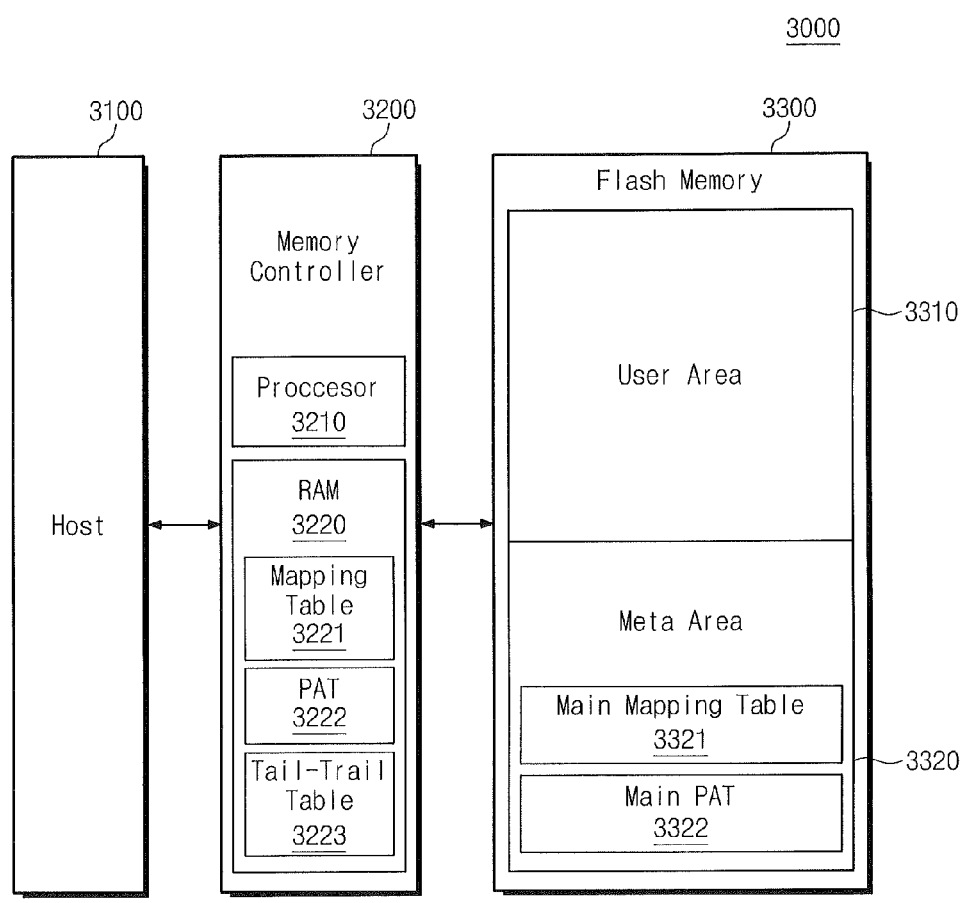
FIG. 10 is a block diagram illustrating a system including a flash memory according to some embodiments of the inventive concept.

FIG. 10 is a block diagram illustrating a system including a flash memory according to some embodiments of the inventive concept. Referring to FIG. 10, a system 3000 may include a host 3100, a memory controller 3200, and a flash memory 3300. The memory controller 3200 may include a processor 3210 and a RAM 3220. The RAM 3220 may include a mapping table 3221, a pre-allocation table 3222, and a tail-trail table 3223. The flash memory 3300 may include a user area 3310 and a meta area 3320. The meta area 3320 may include a main mapping table 3321 and a main pre-allocation table 3322. The components 3100, 3200, 3210, 3220, 3221, 3300, 3310, 3320, 3321, and 3322 of FIG. 10 may be same or similar to those described with reference to FIGS. 1 and 7.

The RAM 3220 of the memory controller 3200 may include the tail-trail table 3223. The tail-trail table 3223 may include a physical address of a write memory block to be next allocated and information of a logical unit corresponding to the physical address. For example, the memory controller 3200 may receive a write request corresponding to a write operation of a last page of a first memory block. The memory controller 3200 may decide a write memory block to be next allocated in response to the received write request. The memory controller 3200 may store a physical address of the write memory block to be next allocated and information of a logical unit corresponding to the physical address at the tail-trail table 3223. The memory controller 3200 may allocate a write memory block based on the pre-allocation table 3222 and/or the tail-trail table 3223. The tail-trail table 3223 will be described with reference to FIGS. 12A to 12D.

Figure 11:
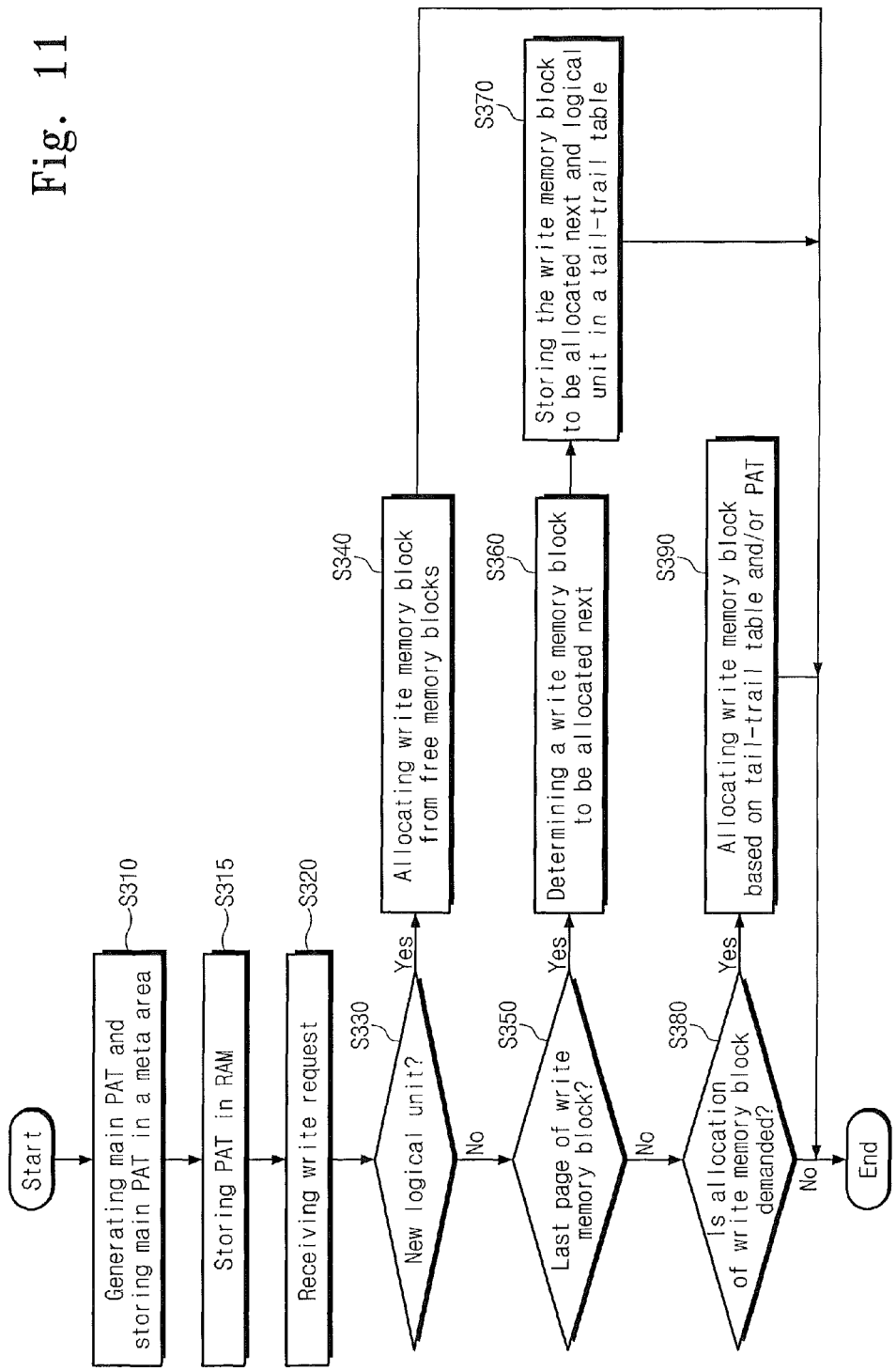
FIG. 11 is a flowchart illustrating a write memory block allocating method according to some embodiments of the inventive concept.

FIG. 11 is a flowchart illustrating a write memory block allocating method according to some embodiments of the inventive concept. Referring to FIG. 11, operations S310, S315, and S320 may be same or similar to operations S210, S220, and S230 of FIG. 8.

In operation S330, the memory controller 3200 may determine whether a received write request is a write request on a new logical unit. For example, if a write memory block is allocated in response to a write request corresponding to a logical unit LUa, a next write request on the logical unit LUa may not be a write request on a new logical unit.

If the received write request is a write request on a new logical unit, in operation S340, the memory controller 3200 may allocate a write memory block from free memory blocks of the flash memory 3300. In this case, the memory controller 3200 may update the mapping table 3221 of the RAM 3220 based on a physical address of the allocated write memory block and a logical address corresponding to the physical address. The memory controller 3200 may flush the updated mapping table 3221 to the main mapping table 3321.

If the received write request is not a write request on a new logical unit, in operation S350, the memory controller 3200 may determine whether the received write request is a write request on a last page of the allocated write memory block. If so, the method proceeds to operation S360. If not, the method proceeds to operation S380.

In operation S360, the memory controller 3200 may decide a write memory block to be next allocated. For example, the memory controller 3200 may decide a memory block to be next allocated of free memory blocks. In operation S370, the memory controller 3200 may store a physical address of a write memory block to be next allocated and information of a logical unit corresponding to the physical address at the tail-trail table 3223. The memory controller 3200 may control the flash memory 3300 such that a physical address of a memory block to be next allocated is stored at a spare area of a last page.

In operation S380, the memory controller 3200 may determine whether allocation of a write memory block is required. For example, if a write memory block on a logical unit corresponding to the received write request does not include a usable page, the memory controller 3200 may determine the allocation of the write memory block to be required.

In the case that the allocation of the write memory block is required, the memory controller 3200 may allocate a write memory block based on the tail-trail table 3223 and a pre-allocation table 3222. In some embodiments, in the case that no allocation order information of free memory blocks included in the pre-allocation table 3222 exists, the memory controller 3200 may allocate a write memory block based on free memory blocks of the flash memory 3300.

FIGS. 12A to 12D are diagrams illustrating a write memory block allocating method according to some embodiments of the inventive concept. In some embodiments, the flash memory 3300 may include the meta area 3320 and first to fourth memory blocks BLK1 to BLK4 as free memory blocks. The meta area 3320 may include the main pre-allocation table 3322. The main pre-allocation table 3322 may include allocation order information of the fourth memory block BLK4. Since allocation order information of the fourth memory block BLK4 is stored at the main pre-allocation table 3322, the fourth memory block BLK4 may be excluded from free memory blocks.

The memory controller 3200 may read the main pre-allocation table 3322 to store it in the RAM 3220. The RAM 3330 may include the pre-allocation table 3222 and the tail-trail table 3223. The tail-trail table 3223 may include a physical address of a write memory block to be next allocated and information of a logical unit corresponding to the physical address. In some embodiments, the memory controller 3200 may allocate a write memory block based on the tables 3222 and 3223 stored in the RAM 3220.

Figure 12A:
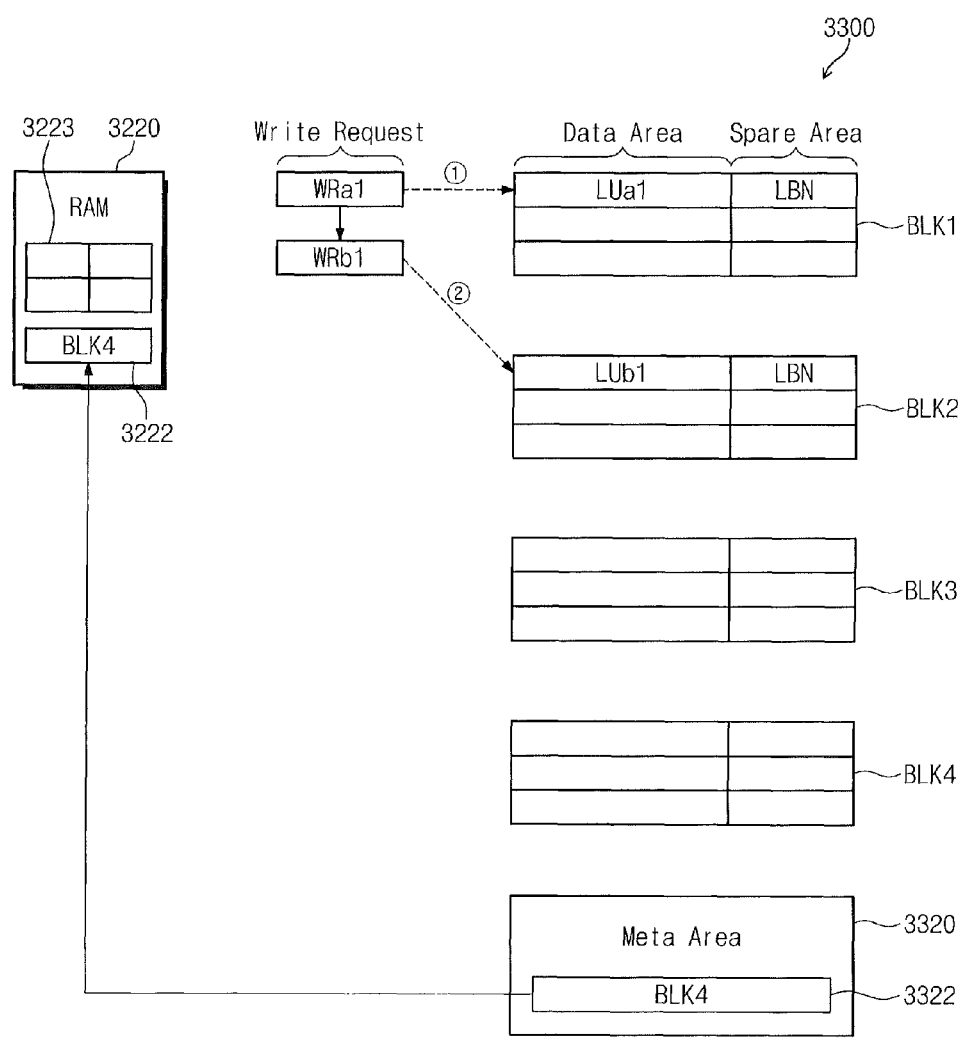
FIGS. 12A to 12D are diagrams illustrating a write memory block allocating method according to some embodiments of the inventive concept.

Referring to FIG. 12A, the memory controller 3200 may receive write requests WRa1 and WRb1. The write requests WRa1 and WRb1 are write requests on new logical units LUa and LUb. Thus, the memory controller 3200 may allocate first and second write memory blocks BLK1 and BLK2 in response to the write requests WRa1 and WRb1. In some embodiments, the memory controller 3200 may store physical addresses of the first and second write memory blocks BLK1 and BLK2 allocated as write memory blocks and logical addresses corresponding to the physical addresses at the mapping table 3221. The mapping table 3221 may be flushed to the main mapping table 3321 of the flash memory 3300.

Figure 12B:
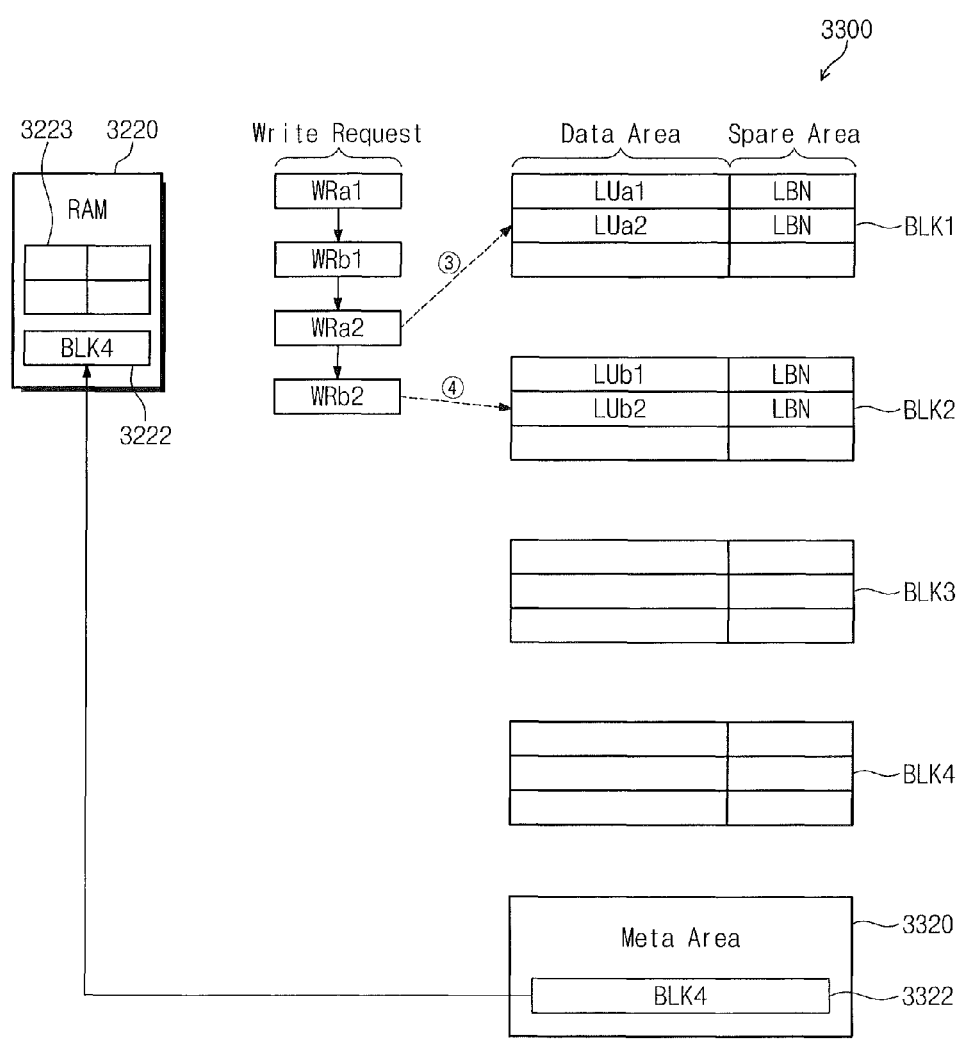

Referring to FIG. 12B, the memory controller 3200 may receive write requests WRa2 and WRb2. The write requests WRa2 and WRb2 are not write requests on new logical units. The memory controller 3200 may control the flash memory 3300 such that data LUa2 and LUb2 corresponding to the write requests WRa2 and WRb2 are written in the first and second write memory blocks BLK1 and BLK2, respectively.

Figure 12C:
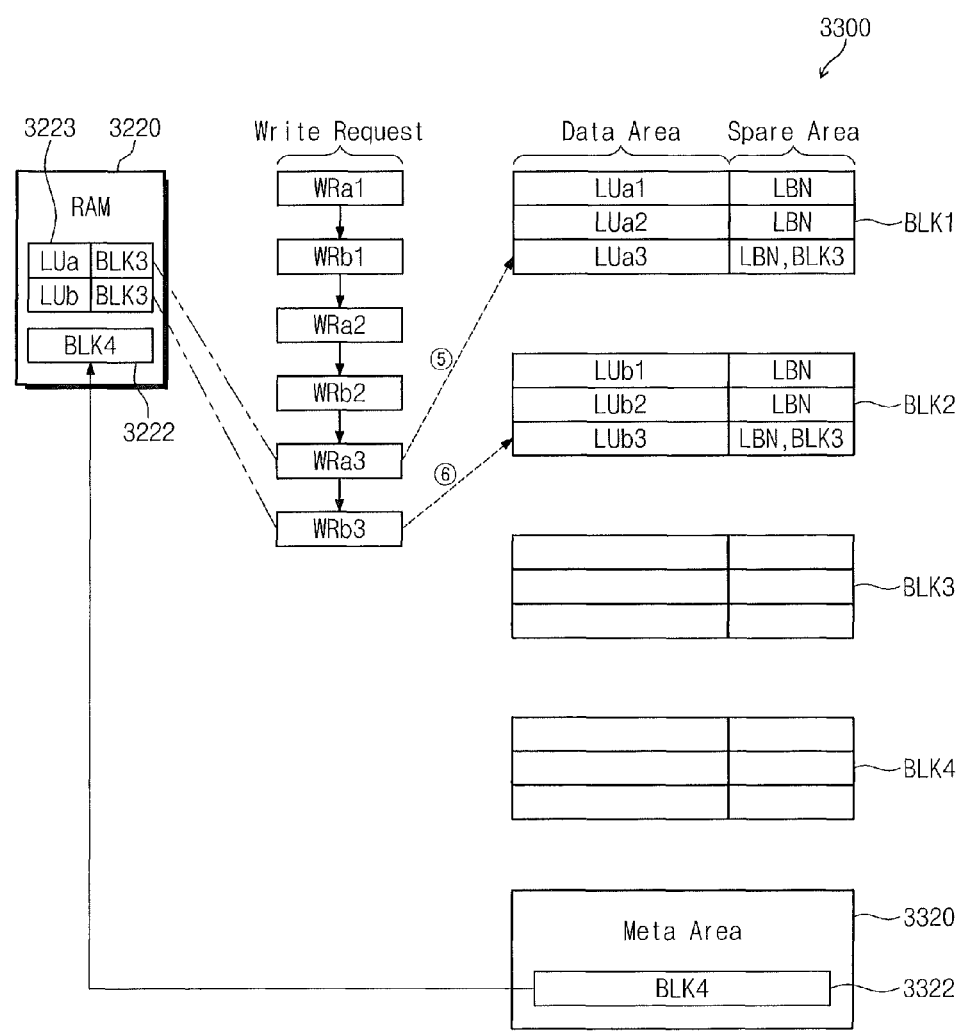

Referring to FIG. 12C, the memory controller 3200 may receive write requests WRa3 and WRb3. The write requests WRa3 and WRb3 are not write requests on new logical units. The write requests WRa3 and WRb3 may be write requests on last pages of the first and second write memory blocks BLK1 and BLK2 allocated as write memory blocks. Thus, the memory controller 3200 may decide write memory blocks to be next allocated.

For example, the memory controller 3200 may decide write memory blocks to be next allocated based on free memory blocks of the flash memory 3300. Since the first and second memory blocks BLK1 and BLK2 were allocated as write memory blocks, they may not be free memory blocks. Also, since allocation order information of the fourth memory block BLK4 is included in the pre-allocation table 3323, the fourth memory block BLK4 may not be a free memory block. A third memory block BLK3 may be a free memory block.

The memory controller 3200 may decide the third memory block BLK3 as a write memory block to be next allocated in response to write requests WRa3 and WRb3. That is, the memory controller 3200 may decide a write memory block to be next allocated in duplication. The memory controller 3200 may control the flash memory 3300 such that a physical address of the third memory block BLK3 is written at spare areas of last pages of the first and second write memory blocks BLK1 and BLK2. The memory controller 3200 may store a physical address of the third memory block BLK3 and information of corresponding logical units LUa and LUb at the tail-trail table 3223.

Figure 12D:
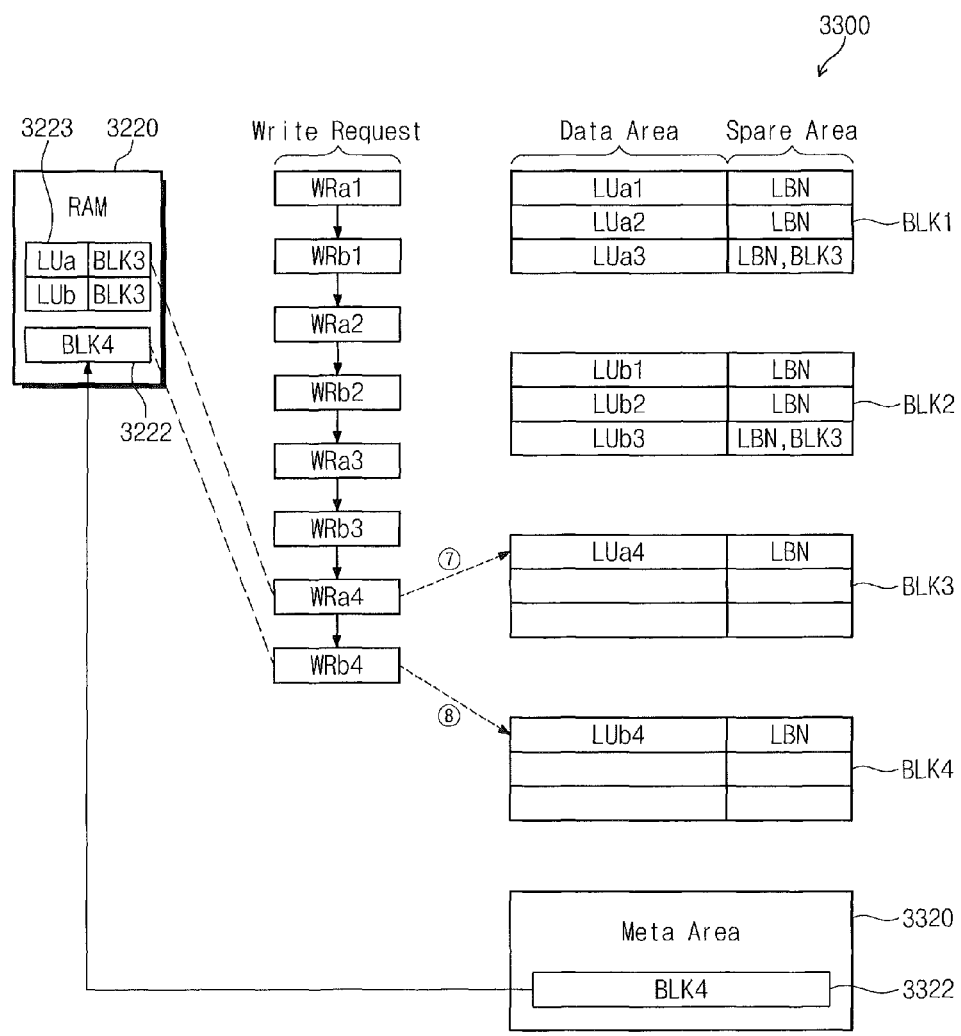

Referring to FIG. 12D, the memory controller 3200 may receive write requests WRa4 and WRb4. The write requests WRa4 and WRb4 are not write requests on new logical units. The write requests WRa4 and WRb4 are not write requests on last pages of write memory blocks. Allocation of a write memory block on the write requests WRa4 and WRb4 may be required. Thus, the memory controller 3200 may allocate a write memory block based on a tail-trail table 3223 and a pre-allocation table 3222.

For example, the memory controller 3200 may scan the tail-trail table 3221 in response to the write request WRa4. The memory controller 3200 may allocate a third memory block BLK3 as a write memory block on the write request WRa4 based on the scanned information.

Afterwards, the memory controller 3200 may scan the tail-trail table 3223 in response to the write request WRb4. The tail-trail table 3223 may include physical address information of a logical unit LUb of the write request WRb4 and the third memory block BLK3. However, since the third memory block BLK3 was allocated as a write memory block on the write request WRa4, the memory controller 3200 may not allocate the third memory block BLK3 in response to the write request WRb4.

In the case that a write memory block is not allocated according to the tail-trail table 3223, the memory controller 3200 may allocate a write memory block based on the pre-allocation table 3323. The memory controller 3200 may allocate a fourth memory block BLK4 as a write memory block based on the pre-allocation table 3323.

With the above description, the memory controller 3200 may flush pre-allocation information only once. In the case that the first and second memory blocks BLK1 and BLK2 are allocated, the memory controller 3200 may update the mapping table 3221 to flush the updated mapping table 3221 to the main mapping table 3321. Thus, in the case that the third and fourth memory blocks BLK3 and BLK4 are allocated as write memory blocks, a flush operation on the mapping table 3221 may not be required. Also, in the case that the mapping table 3221 is lost due to sudden power-off, a mapping table may be recovered by scanning spare areas of the first and second memory blocks BLK1 and BLK2 and the pre-allocation table 3223.

FIGS. 13A to 13D are diagrams illustrating a write memory block allocating method according to some embodiments of the inventive concept. In some embodiments, the flash memory 3300, first to fourth memory blocks BLK1 to BLK4, a RAM 3220, a pre-allocation table 3222, the tail-trail table 3223, the meta area 3320, and the main pre-allocation table 3322 are described with reference to FIGS. 12A to 12D. In some embodiments, when a write request on a new logical unit is received, the memory controller 3200 may allocate a write memory block based on the pre-allocation table 3222.

Figure 13A:
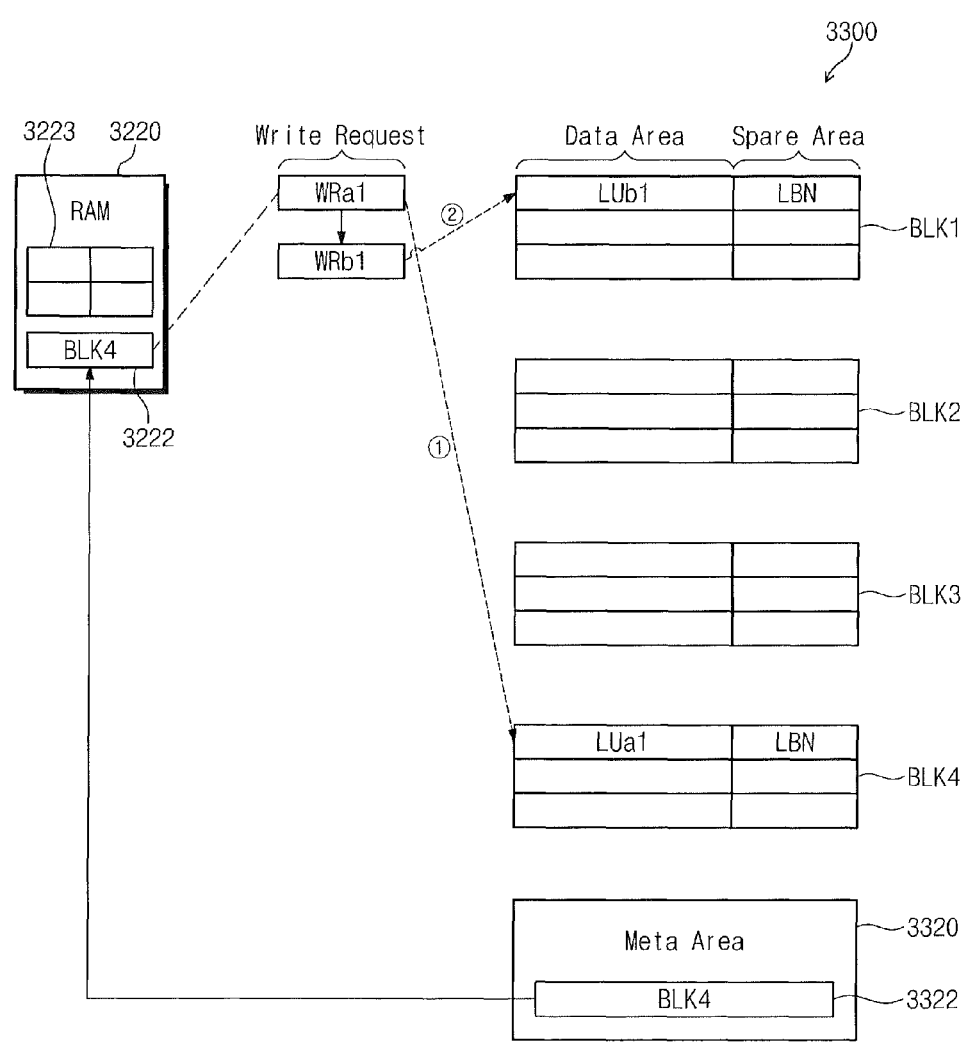
FIGS. 13A to 13D are diagrams illustrating a write memory block allocating method according to some embodiments of the inventive concept.

Referring to FIG. 13A, the memory controller 3200 may receive write requests WRa1 and WRb1. The write requests WRa1 and WRb1 are write requests on new logical units LUa and LUb. The memory controller 3200 may allocate the fourth memory block BLK4 as a write memory block based on the pre-allocation table 3323.

Afterwards, the memory controller 3200 may allocate a first memory block BLK1 of free memory blocks as a write memory block in response to the write request WRb1. In some embodiments, a physical address of the first memory block BLK1 and a corresponding logical address may be flushed to the main mapping table 3322.

Figure 13B:
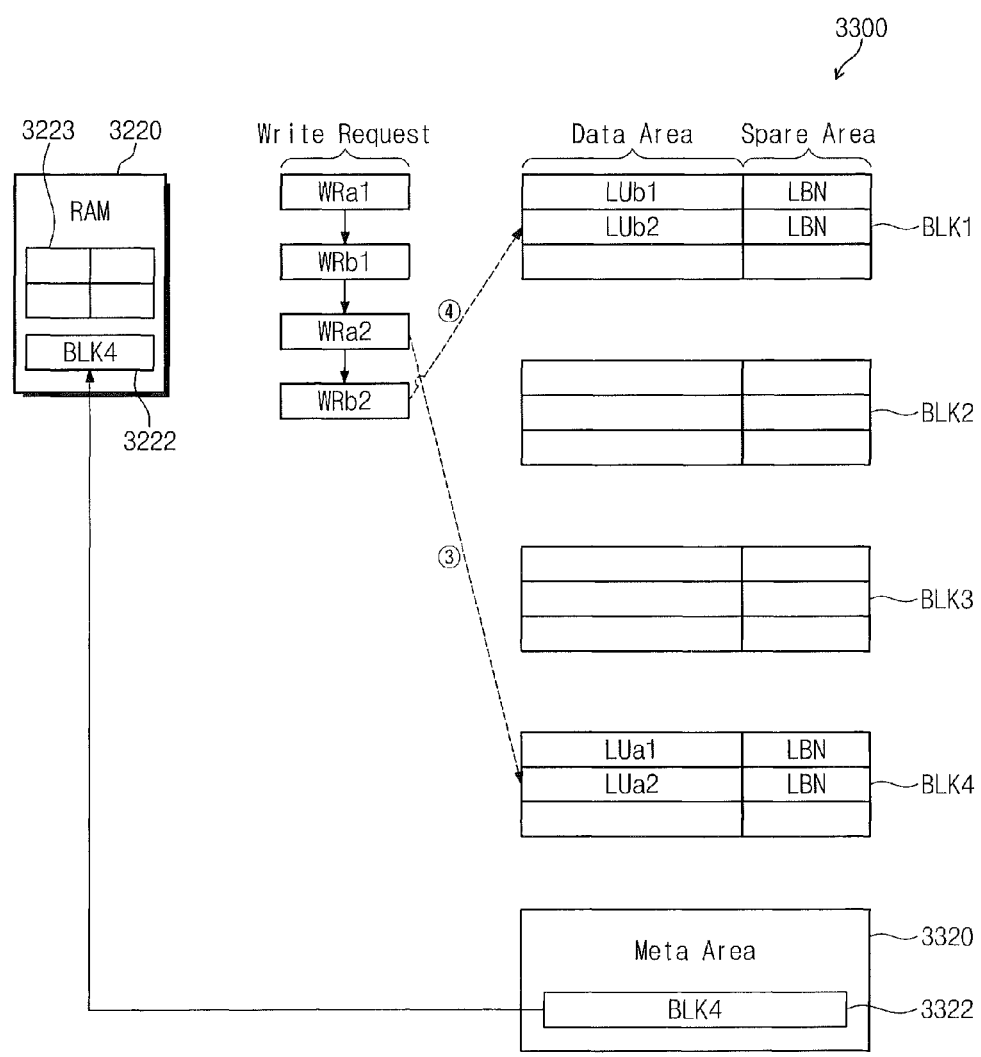

Referring to FIG. 13B, the memory controller 3200 may receive write requests WRa2 and WRb2. The write requests WRa2 and WRb2 are not write requests on new logical units. The write requests WRa2 and WRb2 are write requests on last pages of write memory blocks BLK4 and BLK1 allocated. The write requests WRa2 and WRb2 are not write requests requiring allocation of a new write memory block. Thus, when the write requests WRa2 and WRb2 are received, the memory block 3200 may control the flash memory 3300 such that data LUa2 and LUb2 are stored in the fourth and first memory blocks BLK4 and BLK1, respectively.

Figure 13C:
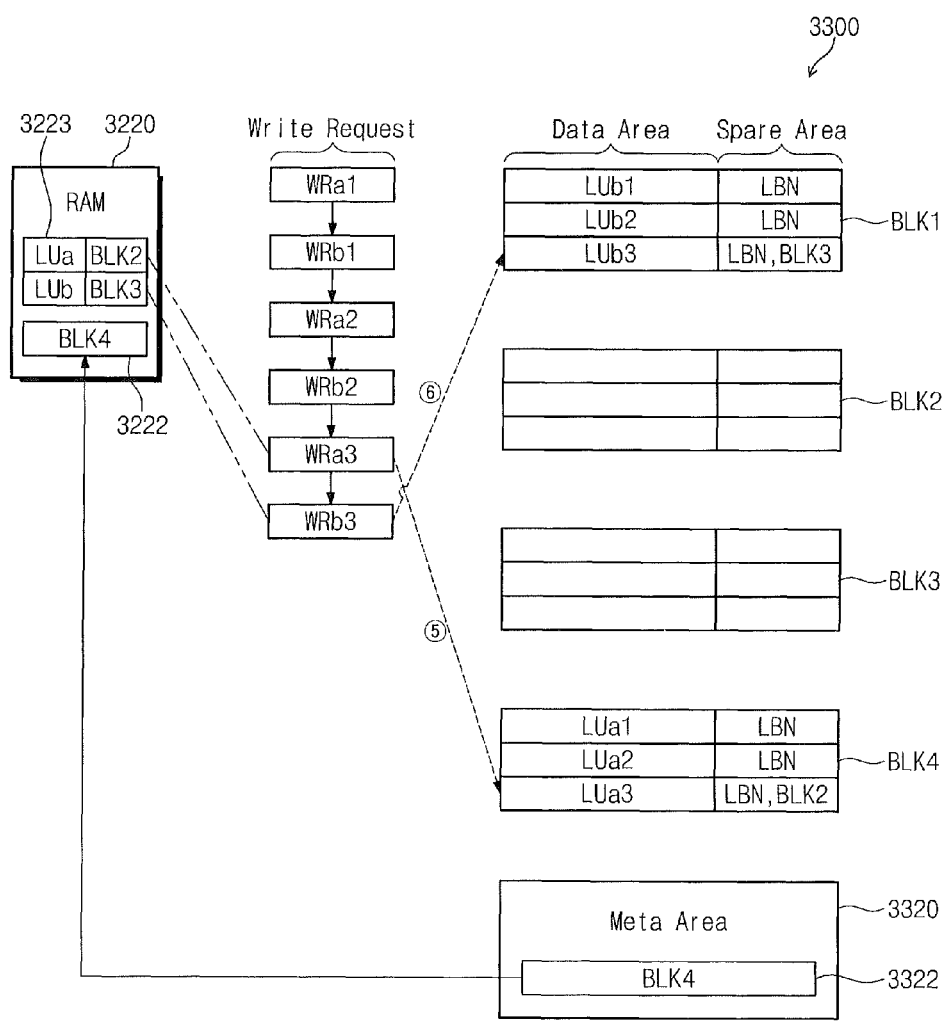

Referring to FIG. 13C, the memory controller 3200 may receive write requests WRa3 and WRb3. The write requests WRa3 and WRb3 are write requests on last pages of the fourth and first write memory blocks BLK4 and BLK1. Thus, the memory controller 3200 may decide write memory blocks to be next allocated in response to the write requests WRa3 and WRb3. For example, the memory controller 3200 may decide second and third memory blocks BLK2 and BLK3 of free memory blocks, as a write memory blocks to be next allocated. The memory controller 3200 may control the flash memory 3300 such that physical addresses of the second and third memory blocks BLK2 and BLK3 are stored at spare areas of last pages of the fourth and first memory blocks BLK4 and BLK1, respectively.

In some embodiments, the memory controller 3200 may store physical addresses of the second and third memory blocks BLK2 and BLK3 decided to be write memory blocks to be next allocated and information of corresponding logical units LUa and LUb at the tail-trail table 3221.

Figure 13D:
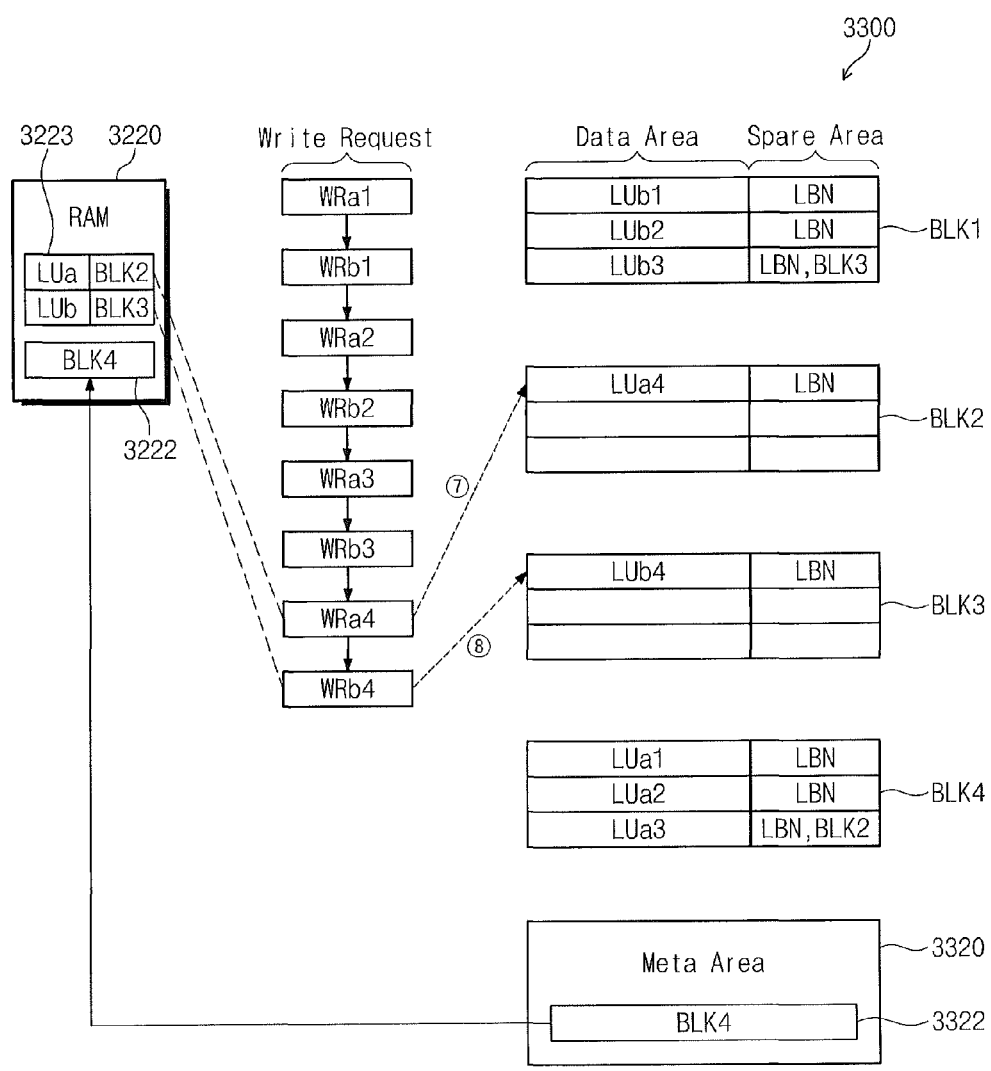

Referring to FIG. 13D, the memory controller 3200 may receive write requests WRa4 and WRb4. The write requests WRa4 and WRb4 are not write requests on new logical units. Since the fourth and first memory blocks BLK4 and BLK1 allocated to the logical units LUa and LUb do not include a usable page, the write requests WRa4 and WRb4 may be write requests necessitating allocation of write memory blocks. Thus, when the write requests WRa4 and WRb4 are received, the memory controller 3200 may allocate write memory blocks based on the tail-trail table 3223. For example, the memory controller 3200 may scan the tail-trail table 3223. When the write requests WRa4 and WRb4 are received, the memory controller 3200 may allocate the second and third memory blocks BLK2 and BLK3 as write memory blocks based on scan information of the tail-trail table 3223.

With the above description, the main pre-allocation table 3323 may be flushed to the meta area 3320 once at an initial stage. Also, in a case where the first memory block is allocated, the mapping table 3221 may be flushed to the main mapping table 3321. When the second and third memory blocks BLK2 and BLK3 are allocated as write memory blocks, flushing of the mapping table may not be required. Thus, it is possible to improve a speed of the system 3000.

Figure 14:
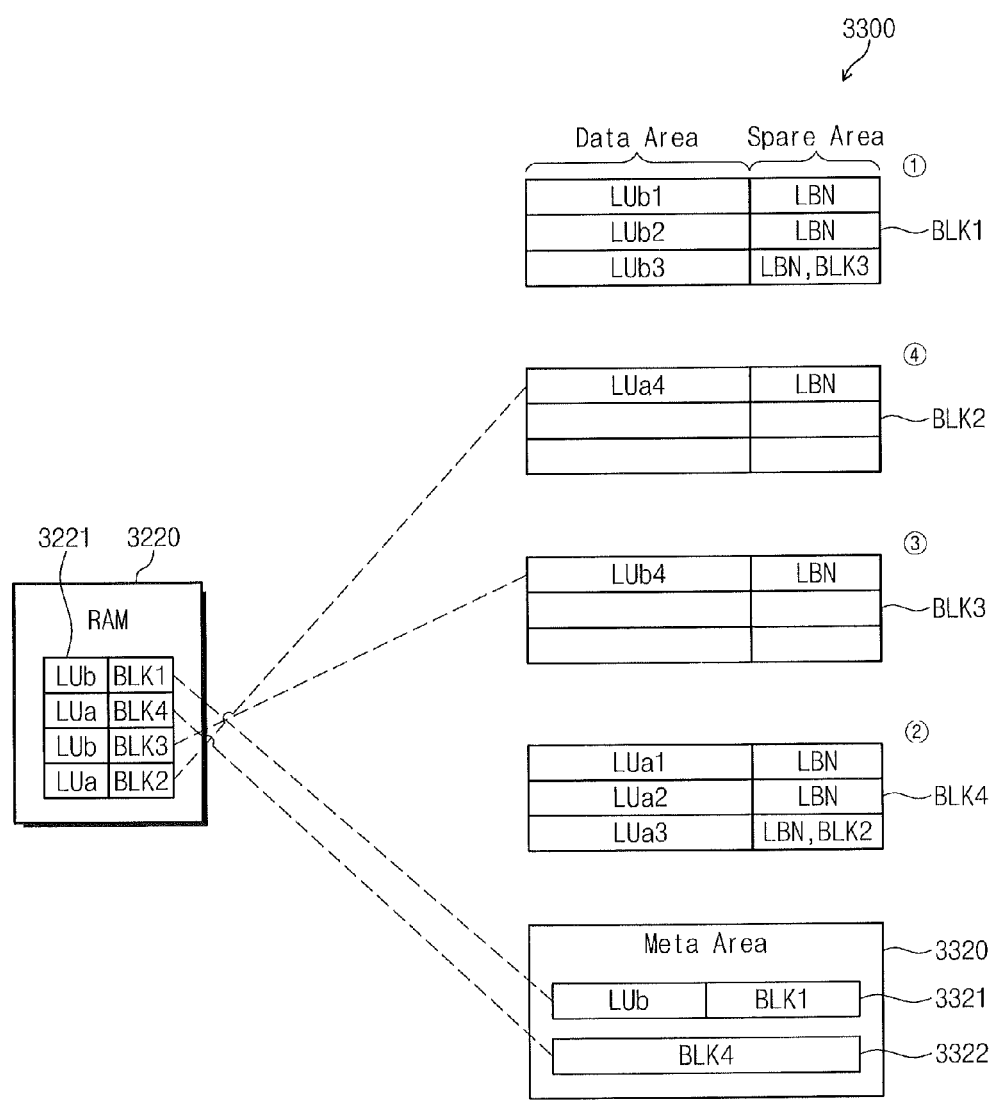
FIG. 14 is a diagram illustrating a mapping table recovering operation of a memory controller according to some embodiments of the inventive concept.

FIG. 14 is a diagram illustrating a mapping table recovering operation of a memory controller according to some embodiments of the inventive concept. A mapping table recovering operation of a memory controller will be described with reference to FIG. 14.

Referring to FIG. 14, a memory controller 3200 may be reset due to sudden power-off. In this case, the mapping table 3221 stored in the RAM 3220 of the memory controller 3200 may be lost. The memory controller 3200 may recover the mapping table 3221 by scanning the meta area 3320 and spare areas of first to fourth memory blocks BLK1 to BLK4.

For example, the memory controller 3200 may scan the main mapping table 3321 of the meta area 3320. As described with reference to FIG. 13A, the main mapping table 3321 may include mapping relationship between a logical unit LUb and a first memory block BLK1. Thus, the memory controller 3200 may recover the mapping table 3221 based on the mapping relationship between a logical unit LUb and a first memory block BLK1. The memory controller 3200 may scan a main pre-allocation table 3322. The main pre-allocation table 3322 may include allocation order information of a fourth memory block BLK4. Thus, the memory controller 3200 may scan a spare area of the fourth memory block BLK4, and may recover the mapping table 3221 based on mapping relationship between the fourth memory block BLK4 and a logical unit LUb.

The memory controller 3200 may scan spare areas of first and fourth memory blocks BLK1 and BLK4. The spare areas of the first and fourth memory blocks BLK1 and BLK4 may include physical addresses of second and third memory blocks BLK2 and BLK3 as write memory blocks to be next allocated. Thus, the memory controller 3200 may scan the first and fourth memory blocks BLK1 and BLK4, and may recover mapping relationship between the second and third memory blocks BLK2 and BLK3 and logical units LUa and LUb.

As described above, a number of flush operations of the mapping table 3221 may be reduced. Also, it is possible to recover the mapping table 3221 at initialization of the memory controller 3200 due to sudden power-off. Thus, it is possible to improve a speed of the system 3000 and to secure the stability thereof.

Figure 15:
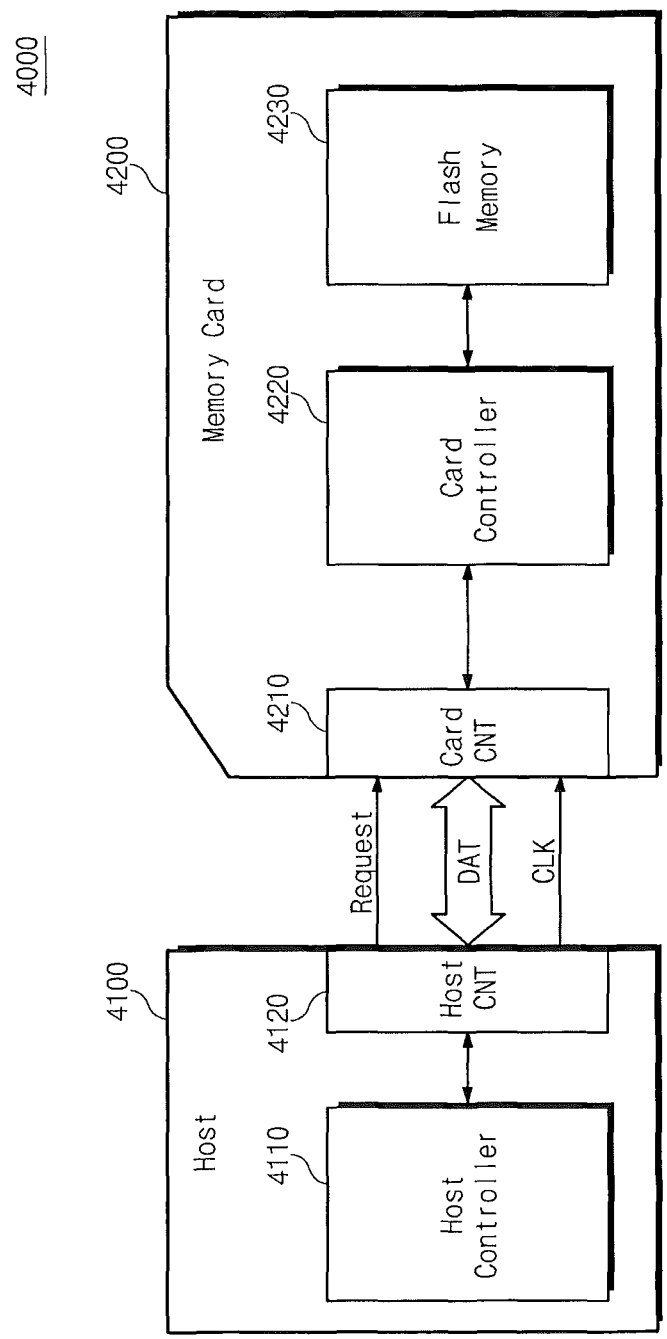
FIG. 15 is a block diagram illustrating a memory card system according to some embodiments of the inventive concept.
Figure 16:
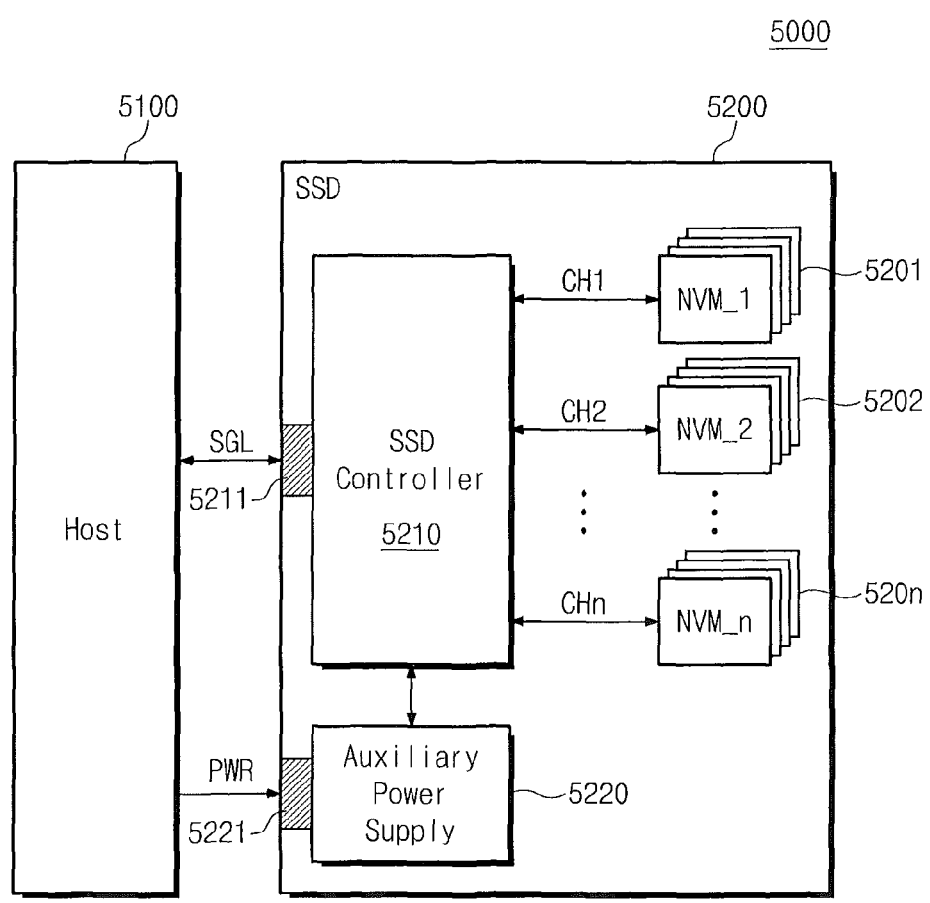
FIG. 16 is a block diagram illustrating a solid state drive system according to some embodiments of the inventive concept.

FIGS. 15 and 16 are block diagrams illustrating systems according to some embodiments of the inventive concept.

FIG. 15 is a block diagram illustrating a memory card system according to some embodiments of the inventive concept. A memory card system 4000 may include a host 4100 and a memory card 4200. The host 4100 may include a host memory controller 4110 and a host connection unit 4120. The memory card 4200 may include a card connection unit 4210, a card memory controller 4220, and a flash memory 4230. Herein, the card memory controller 4220 may allocate write memory blocks according to a write memory block allocating method which is described above.

The host 4100 may write data in the memory card 4200 and read data from the memory card 4200. The host memory controller 4110 may send a command (e.g., a write command), a clock signal CLK generated from a clock generator in the host 4100, and data to the memory card 4200 via the host connection unit 4120.

The card memory controller 4220 may store data in the flash memory 4230 in response to a command input via the card connection unit 4210. The data may be stored in synchronization with a clock signal generated from a clock generator in the card memory controller 4220. The flash memory 4230 may store data transferred from the host 3100. For example, in a case where the host 4100 is a digital camera, the memory card 4200 may store image data.

The card memory controller 4220 of the memory card 4200 may improve the performance of the flash memory 4230 by reducing a number of flush operations of a mapping table.

FIG. 16 is a block diagram illustrating a solid state drive system according to some embodiments of the inventive concept. Referring to FIG. 16, a solid state drive (SSD) system 5000 may include a host 5100 and an SSD 5200. The SSD 5200 may exchange signals SGL with the host 5100 via a signal connector 5211, and may be supplied with a power via a power connector 5221. The SSD 5200 may include a plurality of flash memories 5201 to 520n, an SSD memory controller 5210, and an auxiliary power supply 5220. Herein, when a write request is received, the SSD memory controller 5210 may allocate a write memory block based on the above-described write memory allocating methods.

The flash memories 5201 to 520n may be used as storage of the SSD 5200. The SSD 5200 may use not only the flash memory but also nonvolatile memory devices such as PRAM, MRAM, ReRAM, and so on. The plurality of flash memories 5201 to 520n may be connected with the SSD memory controller 5210 via a plurality of channels CH1 to CHn. One channel may be connected with one or more flash memories. Flash memories connected with one channel may be connected with the same data bus.

The SSD memory controller 5210 may exchange signals SGL with the host 5100 via the signal connector 5211. Herein, the signals SGL may include a command, an address, data, and so on. The SSD memory controller 5210 may be configured to write or read out data to or from a corresponding flash memory according to a request of the host 5100.

The auxiliary power supply 5220 may be connected with the host 5100 via the power connector 5221. The auxiliary power supply 5220 may be charged by a power PWR from the host 5100. The auxiliary power supply 5220 may be placed inside or outside the SSD 5200. For example, the auxiliary power supply 5220 may be on a main board to supply an auxiliary power to the SSD 5200.

The SSD memory controller 5210 may allocate memory blocks of the flash memories 5201 to 520n according to write memory block allocating methods according some embodiments of the inventive concept. Thus, performance of the SSD system 5000 may be improved by reducing a number of flushing operations of a mapping table.

A storage device according to the inventive concept may be packed by a variety of packages. For example, a flash memory and a memory controller may be packed by packages such as PoP (Package on Package), Ball grid arrays (BGAs), Chip scale packages (CSPs), Plastic Leaded Chip Carrier (PLCC), Plastic Dual In-Line Package (PDIP), Die in Waffle Pack, Die in Wafer Form, Chip On Board (COB), Ceramic Dual In-Line Package (CERDIP), Plastic Metric Quad Flat Pack (MQFP), Thin Quad Flatpack (TQFP), Small Outline (SOIC), Shrink Small Outline Package (SSOP), Thin Small Outline (TSOP), System In Package (SIP), Multi Chip Package (MCP), Wafer-level Fabricated Package (WFP), or Wafer-Level Processed Stack Package (WSP).

The above-disclosed subject matter is to be considered illustrative, and not restrictive, and the appended claims are intended to cover all such modifications, enhancements, and other embodiments, which fall within the true spirit and scope of the inventive concept. Thus, to the maximum extent allowed by law, the scope is to be determined by the broadest permissible interpretation of the following claims and their equivalents, and shall not be restricted or limited by the foregoing detailed description.

What is claimed is:

1. A write memory block allocating method of a memory controller configured to control a flash memory, comprising:
   generating a main pre-allocation table including allocation order information of a pre-allocated memory block included in the flash memory;
   storing the main pre-allocation table in a meta area of the flash memory;
   storing a pre-allocation table in a Random Access Memory (RAM) of the memory controller by reading the main pre-allocation table at the meta area of the flash memory;
   receiving a write request from a host;
   determining whether the write request is for a new logical unit;
   determining whether a write memory block for the write request can be allocated according to the pre-allocation table;
   allocating the pre-allocated memory block as the write memory block according to the pre-allocation table when the write request is not for a new logical unit and when the write memory block can be allocated according to the pre-allocation table;
   allocating a free memory block as the write memory block according to a tail-trail table in the memory controller when the write request is not for a new logical unit and when the write memory block cannot be allocated according to the pre-allocation table, wherein the pre-allocation table does not include allocation order information of the free memory block, and the tail-trail table includes a physical address of the free memory block and identification information of a logical unit of the write request; and
   allocating a free memory block as the write memory block without using the tail-trail table in the memory controller and the pre-allocation table when the write request is for a new logical unit.

2. The write memory block allocating method of claim 1, further comprising storing the tail-trail table in the RAM of the memory controller.

3. The write memory block allocating method of claim 1, further comprising:
   recovering a mapping table from the memory controller using the main pre-allocation table and a main mapping table in the meta area of the flash memory.

4. The write memory block allocating method of claim 1, further comprising storing data and a logical address of the data at the write memory block in response to the write request.

* * * * *